(12) United States Patent
Rijnders

(10) Patent No.: US 10,586,312 B2
(45) Date of Patent: Mar. 10, 2020

(54) METHOD FOR IMAGE PROCESSING AND VIDEO COMPRESSION WITH SPARSE ZONE SALIENT FEATURES

(71) Applicant: COGISEN S.R.L., Naples (IT)

(72) Inventor: Christiaan Erik Rijnders, Rome (IT)

(73) Assignee: COGISEN S.R.L., Naples (IT)

( * ) Notice: Subject to any disclaimer, the term of this patent is extended or adjusted under 35 U.S.C. 154(b) by 56 days.

(21) Appl. No.: 15/899,331

(22) Filed: Feb. 19, 2018

(65) Prior Publication Data

US 2018/0240221 A1   Aug. 23, 2018

(30) Foreign Application Priority Data

Feb. 17, 2017   (EP) .................................... 17156726

(51) Int. Cl.
| | |
|---|---|
| H04N 7/12 | (2006.01) |
| G06T 5/10 | (2006.01) |
| H04N 19/149 | (2014.01) |
| G06T 5/00 | (2006.01) |
| H04N 19/139 | (2014.01) |

(52) U.S. Cl.
CPC ................ *G06T 5/10* (2013.01); *G06T 5/002* (2013.01); *H04N 19/139* (2014.11); *H04N 19/149* (2014.11); *G06T 2207/20212* (2013.01)

(58) Field of Classification Search
CPC . G06T 5/10; G06T 5/002; G06T 2207/20212; G06K 9/522; H04N 19/139; H04N 19/149
See application file for complete search history.

(56) References Cited

U.S. PATENT DOCUMENTS

| | | | |
|---|---|---|---|
| 2009/0238466 A1 | 9/2009 | Golan et al. | |
| 2015/0310303 A1* | 10/2015 | Andreopoulos | ..... G06K 9/4676 |
| | | | 382/158 |
| 2018/0239952 A1 | 8/2018 | Rijnders | |

FOREIGN PATENT DOCUMENTS

| | | |
|---|---|---|
| EP | 3364342 A1 | 8/2018 |
| EP | 3364343 A1 | 8/2018 |

OTHER PUBLICATIONS

Caviedes, J.E. et al., "Closed-Loop Video Processing for Objective Quality Optimization", 13th European Signal Processing Conference, IEEE, pp. 1-4, (2005).

(Continued)

*Primary Examiner* — Richard T Torrente
(74) *Attorney, Agent, or Firm* — Steinfl + Bruno LLP

(57) ABSTRACT

A method for video compression through image processing and object detection, based on images or a digital video stream of images, to enhance and isolate frequency domain signals representing content to be identified, and decrease or ignore frequency domain noise with respect to the content. A digital image or sequence of digital images defined in a spatial domain are obtained. One or more pairs of sparse zones are selected, each pair generating a selected feature, each zone defined by two sequences of spatial data. The selected features are transformed into frequency domain data. The transfer function, shape and direction of the frequency domain data are varied for each zone, thus generating a normalized complex vector for each feature. The normalized complex vectors are then combined to define a model of the content to be identified.

10 Claims, 23 Drawing Sheets

(56) References Cited

OTHER PUBLICATIONS

Guo, C. et al., "A Novel Multiresolution Spatiotemporal Saliency Detection Model and Its Applications in Image and Video Compression", IEEE Transactions on Image Processing, vol. 19, No. 1, pp. 185-198, (2010).

Guo, C. et al., "Spatio-Temporal Saliency Detection Using Phase Spectrum of Quaternion Fourier Transform", Computer Vision and Pattern Recognition (CVPR), IEEE, pp. 1-8, (2008).

Hou, X. et al., "Saliency Detection: A Spectral Residual Approach", Computer Vision and Pattern Recognition (CVPR), IEEE, pp. 1-8, (2007), 9 pages.

Itti, L. et al., "A Model of Saliency-Based Visual Attention for Rapid Scene Analysis", IEEE Transactions on Pattern Analysis and Machine Intelligence, vol. 20, No. 11, pp. 1254-1259, (1998).

Koch, C. et al., "Shifts in Selective Visual Attention: Towards the Underlying Neural Circuitry", Human Neurobiology, 4, pp. 219-227, (1985).

Le Meur, O. et al., "A Coherent Computational Approach to Model the Bottom-Up Visual Attention", IEEE Transactions on Pattern Analysis and Machine Intelligence, vol. 28, No. 5, pp. 802-817, (2006) 17 pages.

Li, C. et al., "Spatio-Temporal Saliency Perception via Hypercomplex Frequency Spectral Contrast", Sensors, 13, pp. 3409-3431, (2013).

Li, Z. et al., "Visual Attention Guided Bit Allocation in Video Compression", Image and Vision Computing, 29(1), pp. 1-14. (2011).

Mahadevan, V. et al., "Anomaly Detection in Crowded Scenes", Computer Vision and Pattern Recognition (CVPR), IEEE Conference, pp. 1975-1981, (2010). 7 pgs.

Mancus, M. et al., "A Three-Level Computational Attention Model", Proceedings of ICVS Workshop on Computational Attention and Applications (WCAA-2007), 10 pages, (2007).

Marat, S. et al., "Modelling Spatio-Temporal Saliency to Predict Gaze Direction for Short Videos", International Journal of Computer Vision, Springer Verlag, 82(3), pp. 231-243, 12 pages, (2009).

Mishra, A.K. et al., "Active Visual Segmentation", IEEE Transactions on Pattern Analysis and Machine Intelligence, vol. 34, No. 4, pp. 639-653, (2012).

Seo, H.J. et al., "Static and Space-Time Visual Saliency Detection by Self-Resemblance", Journal of Vision, 9(12):15, pp. 1-27, (2009).

Torralba, A., "Contextual Priming for Object Detection", International Journal of Computer Vision, 53(2), pp. 169-191, (2003).

Wolfe, J.M., "Visual Search in Continuous, Naturalistic Stimuli", Vision Research, vol. 34, No. 9, pp. 1187-1195, (1994).

Avraham T. et al., "Esaliency (extended saliency): Meaningful attention using stochastic image modeling." IEEE Transactions on Pattern Analysis and Machine Intelligence, 32, pp. 693-708(2010) 17 pages.

Bian P. et al., "Biological plausibility of spectral domain approach for spatiotemporal visual saliency." International conference on neural information processing, Part 1, LNCS 5506, pp. 251-258,(Nov. 2008) 2 pages.

Borji A. et al., "Quantitative Analysis of Human-Model Agreement in Visual Saliency Modeling: A Comparative Study" IEEE Transactions on Image Processing,vol. 22, Issue 1, pp. 55-69(Jan. 2013) 16 pages.

Bruce N. et al., "Saliency based on information maximization" Advances in neural information processing systems, 18, p. 155(2006) 8 pages.

Bruce N.D. "An attentional framework for stereo vision" Computer and Robot Vision, 2005. Proceeding. The 2nd Canadian Conference on, pp. 88-95,(2005) 8 pages.

Cerf M. et al., "Using semantic content as cues for better scanpath prediction" Proceedings of the 2008 symposium on Eye tracking research & applications, pp. 143-146.(Mar. 2008) 5 pages.

Gao D. et al., "Discriminant Saliency for Visual Recognition from Cluttered Scenes" Proceedings of Neural Information Processing Systems,(2004) 8 pages.

Garcia-Diaz A. et al., "Decorrelation and distinctiveness provide with human-like saliency." International Conference on Advanced Concepts for Intelligent Vision Systems,LNCS 5807, pp. 343-354,(Sep. 2009) 13 pages.

Goferman S. et al., "Context-aware saliency detection." IEEE Transactions on Pattern Analysis and Machine Intelligence, vol. 34, No. 10, pp. 1915-1926, Oct. 2012. 12 pages.

Hamed T. et al., "Fast and efficient saliency detection using sparse sampling and kernel density estimation" Proceedings of the 17th Scandinavian conference on Image analysis,(May 1, 2011), pp. 666-675. 10 pages.

Harel J. et al., "Graph-based visual saliency." NIPS(vol. 1, No. 2. p. 5)(Dec. 2006) 8 pages.

Itti L. et al., "Bayesian Surprise Attracts Human Attention" Advances in Neural Information Processing Systems, vol. 19,(2006) 8 pages.

Judd T. et al., "Learning to predict where humans look." 2009 IEEE 12th International Conference on Computer Vision, pp. 2106-2113,(Sep. 2009) 8 pages.

Kahneman D. et al., "The reviewing of object files: Object-specific integration of information." Cognitive psychology, vol. 24(2), pp. 175-219(1992) 45 pages.

Kienzle W. et al., "A nonparametric approach to bottom-up visual saliency." Advances in neural information processing systems, vol. 19, p. 689(2007) 8 pages.

Kootstra G. et al., "Paying attention to symmetry" British Machine Vision Conference, pp. 1115-1125.(2008) 11 pages.

Li J. et al., "Finding the secret of image saliency in the frequency domain." IEEE transactions on pattern analysis and machine intelligence, vol. 37(12), pp. 2428-2440(2015) 13 pages.

Li J. et al., "Visual saliency based on scale-space analysis in the frequency domain." Journal of Latex Class Files,vol. 6, No. 1,(Jan. 2007) 16 pages.

Li L.J. et al., "Object bank: A high-level image representation for scene classification & semantic feature sparsification." Advances in neural information processing systems, pp. 1378-1386,(2010) 9 pages.

Ma Y-F. et al., "Contrast-based image attention analysis by using fuzzy growing." Proceedings of the eleventh ACM international conference on Multimedia—Multimedia '03,2003 pp. 374-381. 8 pages.

Muddamsetty S.M. "Spatio-Temporal Saliency Detection in Dynamic Scenes using Local Binary Patterns." Pattern Recognition, pp. 2353-2358,(Aug. 2014) 6 pages.

Non Final Office Action for U.S. Appl. No. 15/899,301, filed Feb. 19, 2018 on behalf of Cantaluppi & Partners S.R.L. dated Jun. 25, 2019. 9 Pages.

Peters R.J. et al., "Beyond bottom-up: Incorporating task-dependent influences into a computational model of spatial attention." Computer Vision and Pattern Recognition, p. 1-8,(Jun. 2007) 8 pages.

Schauerte B. et al., "Quaternion-based spectral saliency detection for eye fixation prediction" Computer Vision—ECCV, pp. 116-129(2012) 14 pages.

\* cited by examiner

Any image shape can be used as input

METHOD FOR IMAGE PROCESSING AND VIDEO COMPRESSION WITH SPARSE ZONE SALIENT FEATURES

CROSS REFERENCE TO RELATED APPLICATIONS

This application claims priority to European Patent Application No. 17156726.6, filed on Feb. 17, 2017, the disclosure of which is incorporated herein by reference it its entirety.

BACKGROUND OF THE INVENTION

1. Field of the Invention

The present disclosure is related to a method for image processing and generating data for content detection to improve video compression, intended to be built in any kind of device, possibly a common device, provided with suitable means for digitalizing images. The method is particularly useful for creating temporal models to use in digital video streams, although not limited to digital video streams.

Content is meant to be any object which could be interesting to detect. Then, the concept of content is not limited to objects, i.e. physical items visible through the images, but also objects family selected by argument or kind, e.g. images expressing violence, showing nudities, displaying sport activities, faces in a crowd, identifying vehicles and selecting them by kind or size, discerning pedestrians, cyclists and traffic signals for self-driving vehicle systems, recognizing places or landscapes, and so on. Any field including a step of detecting a certain content among others may be involved in the present invention.

A common device is meant to be an easily commercially available electronic device like a smartphone, a tablet, a laptop or any portable or hand-held device with a suitable digital video camera. On the other hand, the device may be represented by one or more cameras, possibly organized in a network, linked to either a computer or to a server for the image computing. Besides, the video compression method may be simply implemented in an offline process, on stored digital images or videos by a suitable hardware comprising a storage memory, a RAM memory and at least a microprocessor, through a software run in the hardware.

The present disclosures also concern a method for operating a device or a system, provided with at least a digital camera producing a video stream or a series of digital images, to obtain an improvement in video compression through both the camera and a processor of the device or system, in connection with at least one video codec stored in a memory device, accessible by the operated device or system.

The disclosure in this method is related to converting image data into the frequency domain sparsely and therefore very rapidly. It allows for a new data input type for video compression methods that use image processing and content detection to obtain more video compression. Also, this method allows for a plurality of tuning parameters for said conversion into frequency domain data, allowing for optimizations that are chosen according to the characteristics of the image processing or content detection method chosen to improve the video compression.

Further, the method is applicable for using said frequency-domain data in a way that is correlated to the subjective quality of video stream for a given bitrate. This means that the frequency domain data generated with this method can be used to avoid characteristic in the data that would cause compression artefacts in the images. The method thus allows for better subjective video quality for a given bitrate when compressed.

In one of the implementations of the frequency domain calculations disclosed in this method a visual salience map can be created and integrated with a video codec in a manner that it varies the compression. The input for such a salience map is either the current video frame (for within-frame static salience), or the difference between frames (for the between-frames motion salience).

The output of a saliency map is sent to the quantization block of the video encoder, to influence the amount of information allocated to each part of the image, according to the visual saliency. Many codecs provide a way to influence the trade-off between compression and quality. For example, for the popular codec H264, this trade-off is called "rate distortion". Rate-distortion allows the outcome of various decisions made by the encoder to be influenced with respect to bits spent against quality gain. The encoder evaluates decisions based on a rate-distortion curve. The value that controls the rate-distortion curve is typically called Lambda.

Encoders normally vary lambda automatically, to find a compromise for quality vs bitrate. A saliency map created with this method modulates the codec's Lambda independently for each macroblock. The output of the encoding is a fully codec standards-compliant video bit stream. Using the frequency domain data of this method a compression codec can thus be instructed to perform less compression on these areas that are likely to produce artefacts, giving higher subjective video quality for a given bitrate.

2. Description of the Prior Art 2.1 Image Processing and Object Detection for Video Compression Object detection techniques in image processing are being widely applied in various contexts. By way of example and with no limitative purpose, such algorithms are used in human face tagging technology on social networks, in software for the recognition of hand gestures, in automotive software for the detection of pedestrians, cyclists and vehicles, in software for the recognition of body movements, in human facial emotion detection technology for augmented reality and screens with 3D effects, in object recognition for augmented reality, in interfaces using head orientation or eye orientation tracking, in object tracking technology for security systems and finally in gaze tracking technology and also in various video compression techniques.

Known documents relate to the use of these techniques for the purpose of video compression, specifically as additional calculations that process the contents and visual information within the video stream to improve the effectiveness of current video compression codecs.

There is a clear future trend of all these object detection and image processing technologies migrating onto the next generation of interactive interfaces and operating systems. The devices on which such technologies can be represented are, for example, smartphones, tablets, wearable hardware such as interactive glasses or virtual reality interfaces, but also any kind of interactive objects in future homes, offices or public places. These devices can be provided for special uses such as interactive television or intelligent homes, and they can also be used in automotive safety systems, healthcare, advertising, security camera networks, internet-of-things, next to many other possible uses.

Such technology can basically be integrated into any device or network connected device, where reprogrammable hardware is used and where video camera inputs can be added.

Adding extra hardware to devices, purely to help the functioning of object detection and image processing algorithms, implies higher costs and extra battery drain. Then, there are extra research and development costs required to create the miniature hardware, with current state-of-the-art hardware often still being too large to be integrated into most consumer electronics devices.

Besides the hardware costs, to a large degree, what is hindering the mass scale use of such video compression technology on, for example, mobile hardware platforms, is that the required object detection and image processing calculations are too slow to keep up with the frame rate of the cameras or use too much of the available processing power in doing so.

Therefore, before the implementation on the next generation of operating systems and devices become feasible in mass volumes, such video compression technology first will require software-only solutions able to process images a lot faster than the current state of the art.

This migration towards software-only solutions is also being facilitated by continuous camera technology improvements, which bring increasingly higher frame rates, better motion processing, more effective colour highlighting, keener adaptation to contrasts, smarter adaptation to light changes and increasingly higher screen resolutions. This trend will further increase the effectiveness of software-only solutions for object detection.

The need for object detection to use as little processing power as possible is intended for both saving battery life as well as for the requirement for real-time use. While running in real-time, object detection algorithms also need to run in the background without limiting the main processes running in the foreground.

Further, it should be noted that the required amount of calculations may exponentially grow as the input image size increases. A rise in video frame rate would also mean that there would be less time for the image processing algorithm to finish the calculations before the next video input frame arrives.

Therefore, a side effect of the increasingly high video frame rates and growing input image quality is that current state of the art image processing and object detection algorithms, will need to increasingly down-sample input images, to return to acceptable processing speeds, thus losing much of the extra information in the higher quality input image.

Such down-sampling thereby negates a large part of the advantages of having such high definition images in input. Compounding these challenges for object detection is the fact that there is content that needs to be captured that is increasingly only visible in the temporal data of a video stream. Examples are the detection of violence, the detection of the intent of pedestrians, the detection of suspicious behavior on the live feed of a security camera and so forth. It means that two or more images frames of a video stream need to be cross-references in a single model. Current methods are mostly based on training on static images. In other words, videos are processed as a sequence of static images, instead of truly processing temporal data. The added complexity and processing overhead when having to cross-reference multiple frames to process a single classification model will be clear.

When creating a saliency model to be used to modulate the compression of video codecs, such temporal data is of particular importance, meaning that the method described is very effective for such video compression implementations.

It is also not effective to count on the continued improvement of processing power to decrease the relative use of processing power by given algorithms, since the applications, e.g. games with interactive video, scale to use the maximum of processing power, therefore always leaving a minimal amount for algorithms such as object detection to run in the background.

In view of the above, many methods are disclosed in the computer vision literature for object recognition and image processing techniques with which to improve video compression.

2.2 Video Compression

The storage and transmission of digital video in its raw form is very expensive—an analog television video sequence, once digitized, can consume up to 165 megabits per second. To circumvent this problem, a series of video compression techniques have been derived to reduce the number of bits required to represent digital video data, while maintaining an acceptable fidelity or video quality. A video compression method's ability to reduce the bits required is quantified by the "compression ratio" which is the ratio of the size of the original video to the size of the compressed video. These methods typically use image processing and/or object detection to improve the compression ratio.

Video can be considered as a sequence of images which are displayed in order. Each of these images is called a frame. Video signals differ from image signals in several important characteristics. The most important difference is that video signals have a camera frame rate of anywhere from 15 to 60 frames/second, which provides the illusion of smooth motion in the displayed signal. Another difference between image and video compression is the ability to exploit spatial redundancy (within-frame) as well as temporal redundancy (between-frames).

Within-frame coding refers to the fact that compression is performed relative to information that is contained only within the current frame, and not relative to any other frame in the video sequence. In other words, no temporal processing is performed outside of the current picture or frame. Such within-frame coding is very similar to that of a JPEG still image video encoder, with only slight implementation detail differences.

Between-frame coding refers to the fact that typically, 30 frames are displayed on the screen every second. There will be a lot of information repeated in the consecutive frames, so between-frame compression tries to take advantage from temporal redundancy between neighboring frames, thus allowing to achieve higher compression rates. If a tree is displayed for one second, then 30 frames are used for that tree then this repeated information can be compressed by defining the frames based upon previous frames (FIG. 1).

An example of temporal redundancy is "motion compensation" which establishes a correspondence between elements of images in the video sequence. Motion compensation takes advantage of the fact that objects in video sequences tend to move in predictable patterns, and can therefore be encoded as a single object that moves from frame-to-frame, rather than a sequence of images.

Both between frame and within-frame encoding can be "lossless" or "lossy". A human being cannot notice small changes in the frames like a slight difference of colour, so video compression standards do not encode all the details in the video; some of the details are actually lost. This is called lossy compression. In lossless compression the original data can be perfectly reconstructed. It is possible to get very high compression ratios when lossy compression is used.

2.3 Block Encoding

All the most popular video codecs split an image in "blocks" which can be compressed within and between frames. The simplest "blocking" algorithms divide a video frame into equal-sized blocks known as "macroblocks" (FIG. 2).

Instead of directly encoding the raw pixel values for each block, the encoder will try to find a block like the one it encoded on a previously encoded frame, referred to as a "reference frame". This search process is done by a block matching algorithm.

More sophisticated blocking algorithms use uneven block sizes, based on measures of information content and the change between frames. These blocks are typically made by dividing existing blocks into smaller blocks (FIG. 3).

2.4 Variable Block Compression

It is possible to compress some blocks more than others, by applying different compression factors. The difference in compression may be based on several different factors, for example an algorithm may decide that sharp edges should be compressed less, to avoid compression artefacts (FIG. 4).

2.5 Saliency

Saliency means paying more attention to one aspect of a scene than to another because of the amount and type of visual information presented. Saliency is considered to be a key attentional mechanism that facilitates learning and survival by enabling organisms to focus their limited perceptual and cognitive resources on the most pertinent subset of the available sensory data.

A video typically contains a subject that observers pay more attention to, and other parts of the image that are less attended to. The parts of the image that the person pays the most attention to will heavily influence the perceived quality, so may be slightly compressed, while less attended parts of the image may be compressed more heavily without impacting perceived image quality (FIG. 5).

One method of saliency typically used is image analysis to segment out salient objects. This method takes image attributes such as edge detection or contrast, to approximately predict what parts of an image will be salient. For performance reasons, salience algorithms typically use simplistic models, such as edge detection.

Another method of predicting salience is to predict sparse eye fixations. Humans select important visual information based on attention mechanisms in the brain. Given this motivation, earlier works on saliency detection concentrated more on predicting sparse human eye-gaze points that are detected by eye-trackers. Accordingly, most of the research on this track is based on biologically inspired algorithms which try to imitate the dynamics of the human attention mechanism. Most traditional object detectors need training in order to detect specific object categories, but human vision can focus on general salient objects rapidly in a clustered visual scene without training because of the existence of a visual attention mechanism, which allows human vision to deal with general object detection well.

2.6 Segmentation

Segmentation is the act of breaking an image up into regions or objects. Segmentation can be used to ensure that an object of interest is not over-compressed (FIG. 6).

One problem with segmentation is that an object of interest can be divided into parts by segmentation, causing a noticeable difference in compression (FIG. 7).

"Active visual segmentation" then uses a salience map to determine whether a potential segment region contains a fixation point (Mishra et al. [1]), so segmentation can be adjusted to avoid a junction within an object.

The implication is that the object of interest should be identified before the segmentation process begins.

2.7 Bottom-Up Saliency

Saliency can be derived by algorithms that look for specific patterns in image pixels. This is called "bottom-up" salience, because it derives attention predictions purely from patterns in the information. Bottom-up visual saliency can be derived using pixel-level contrast to all other pixels, color differences from the average image color. Some researchers including Bruce and Tsotsos [2] and Zhang et al. [13] attempted to define visual saliency based on information theory. Some others have further used graph-cut algorithms to refine borders of their saliency maps and count for salient object contours and across multiple scales (e.g. Ma and Zhang [3]). While some methods define visual saliency in a local way, some others are based on global rarity of image regions over the entire scene.

Some models address saliency detection in the spatiotemporal domain by employing motion, flicker, optical flow, or interest points learned from the image regions at fixated locations. Recently a new trend called active visual segmentation has emerged with the intention to segment a region that contains a fixation point (Mishra et al. [1]). Their framework combines monocular cues (color/intensity/texture) with stereo and/or motion, in a cue-independent manner.

Some codecs use models of eye physiology and neuroscience to predict which regions are more likely to attract human attention and to be gazed at. From models of human visual selective attention, computational attention models have been made that process low-level features such as orientation, intensity, motion, and then through nonlinear biologically inspired combination of these features, a saliency map can be generated. For example, salient objects that are close together may attract relatively more attention than the same salient objects with more space between them.

Most bottom-up salience models fall into one of the seven general categories:

Cognitive models: Development of saliency-based models escalated after Itti et al.'s (1998) [4] implementation of Koch and Ullman's (1985) [5] computational architecture. Cognitive models were the first to approach algorithms for saliency computation that could apply to any digital image. In these models, the input image is decomposed into feature maps selective for elementary visual attributes (e.g., luminance or color contrast, motion energy), at multiple spatial scales. The feature maps are combined across features and scales to form a master saliency map. An important element of this theory is the idea of center-surround operators, which define saliency as distinctiveness of an image region compared to its surroundings. Almost all saliency models are directly or indirectly inspired by cognitive concepts of visual attention (e.g.: Le Meur et al. (2006); Marat et al. (2009) [6]).

Information-theoretic models: Stepping back from biologically-plausible implementations, models in this category are based on the premise that localized saliency computations serve to guide attention to the most informative image regions first. These models thus assign higher saliency to scene regions with rare (low probability) features. While, in theory, using any feature space is feasible, often these models (inspired by efficient coding in visual cortex) utilize a sparse set of basis functions learned from natural scenes.

Example models in this category are AIM (Bruce & Tsotsos, 2005 [8]), Rarity (Mancas, 2007 [9]), LG (Local+Global image patch rarity) (Borji & Itti, 2012 [10]), and incremental coding length models (Hou & Zhang, 2008 [11]).

Graphical models: Graphical models are generalized Bayesian models, which have been employed for modeling complex attention mechanisms over space and time. Torralba (2003) [12] proposed a Bayesian approach for modeling contextual effects on visual search which was later adopted in the SUN model for fixation prediction in free viewing. Itti & Baldi (2005) [13] defined surprising stimuli as those which significantly change beliefs of an observer. Harel et al. (2007) [14] propagated similarity of features in a fully connected graph to build a saliency map. Avraham & Lindenbaum (2010) [15], Jia Li et al., (2010) [16], and Tavakoli et al. (2011) [17], have also exploited Bayesian concepts for saliency modeling.

Decision theoretic models: This interpretation proposes that attention is driven optimally with respect to the task. Gao & Vasconcelos (2004) [18] argued that, for recognition of objects, salient features are those that best distinguish a class of objects of interest from all other classes. Given some set of features, each one with a location and an assigned a class label (for example, background or objects of interest), saliency is then a measure of mutual information (usually the KullbackLeibler divergence). Besides having good accuracy in predicting eye fixations, these models have been successful in computer vision applications (e.g., anomaly detection and object tracking).

Spectral analysis models: Instead of processing an image in the spatial domain, these models compute saliency in the frequency domain. Hou & Zhang (2007) [19] derive saliency for an image by computing its Fourier transform, preserving the phase information while discarding most of the amplitude spectrum (to focus on image discontinuities), and taking the inverse Fourier transform to obtain the final saliency map.

Pattern classification models: Models in this category use machine learning techniques to learn stimulus-to-saliency mappings, from image features to eye fixations. They estimate saliency as a feature vector which could be the contrast of a location compared to its surrounding neighborhood. Kienzle et al. (2007) [20], Peters & Itti (2007) [21], and Judd et al. (2009) [22] used image patches, scene gist, and a vector of several features at each pixel, respectively, and used pattern classifiers to then learn saliency from the features. Tavakoli et al. (2011) [17] used sparse sampling and kernel density estimation to estimate the above probability in a Bayesian framework. Note that some of these models may not be purely bottom-up since they use features that guide top-down attention, for example faces or text (Judd et al., 2009 [22]; Cerf et al., 2008 [23]).

Other models: Other models exist that do not easily fit into this categorization. For example, Seo & Milanfar (2009) [24] proposed self-resemblance of local image structure for saliency detection. The idea of decorrelation of neural response was used for a normalization scheme in the Adaptive Whitening Saliency (AWS) model (Garcia-Diaz et al., 2009 [25]). Kootstra et al. (2008) [26] developed symmetry operators for measuring saliency and Goferman et al. (2010) [27] proposed a context-aware saliency detection model with successful applications in re-targeting and summarization.

The problem with bottom-up salience is that perceptual sensitivity may not necessarily explain people's attention, because people look for different things in different circumstances. Solving that needs some "top-down" understanding of what a person is seeking to accomplish when viewing an image or video.

2.8 Top-Down Salience

It is also possible to derive saliency "top-down", from knowledge of human intention. Object-based theories of attention propose that humans attend to objects and high-level concepts. People are more attracted to some types of objects than others—for example people are attracted to look at faces in a scene more than other object types. Inspired by these cognitive findings, some models (e.g., Judd et al. [22]) have used object detectors such as faces, humans, animals, and text to detect salient locations.

Models that address top-down, task-dependent influences on attention are complex, because some representations of goal and of task are necessary. In addition, top-down models typically involve some degree of cognitive reasoning, not only attending to but also recognizing objects and their context.

The typical steps in a top-down model are:

Interpret task definition: by evaluating the relevance of known entities (in long-term symbolic memory) to the task at hand, and storing the few most relevant entities into symbolic working memory. For example, if the task is to drive, be alert to traffic signs, pedestrians, and other vehicles.

Prime visual analysis: by priming spatial locations that have been learned to usually be relevant, given a set of desired entities and a rapid analysis of the "gist" and rough layout of the environment, and by priming the visual features (e.g., color, size) of the most relevant entities being looked for (Wolfe, 1994 [28]).

Attend and recognize: the most salient location, given the priming and biasing done at the previous step. Evaluate how the recognized entity relates to the relevant entities in working memory, using long-term knowledge of inter-relationships among entities.

Update: Based on the relevance of the recognized entity, decide whether it should be dropped as uninteresting or retained in working memory (possibly creating an associated summary "object file" (Kahneman et al., 1992 [29]) in working memory) as a potential object and location of interest for action planning.

Iterate: the process until sufficient information has been gathered to allow a confident decision for action.

Act: based on the current understanding of the visual environment and the high-level goals.

The problem with top-down salience is that more sophisticated top-down visual attention models depend on progress in object recognition, which is necessary to enable reasoning about which object to look for next.

Another problem with the described methods is that saliency is not only about what is salient in the frame of a video, but what becomes salient due to compression artifacts. The compression of video can cause artifacts such as ringing, contouring, posturizing, aliasing along curving edges and macroblock boundary artifacts. Heavily compressing an image produces artifact distortions that can cause parts of the image that were not previously salient, to become salient. For example, smoothly textured regions become blocky when very heavily quantized. Salient artefacts are particularly a problem for smooth gradients and objects with regular motions, which often belong to the background of a scene that does not necessarily catch people's attention. But these types of regions are highly perceptually sensitive if not attended to. The background is normally heavily compressed because it is not salient, so any artefact that causes a viewer to look at the background will make them realize how low its quality is.

2.9 Motion/Spatio-Temporal Saliency

Although there is considerable redundancy within each video frame, the largest amount of redundancy occurs between video frames, because typically 80% of the image is unchanged from one frame to the next. Salience also exists between frames, because people pay more attention to moving objects. Macroblocks that have no movement are less salient than those with movement, so they can be compressed more without noticeable degradation in quality (FIG. 8).

The salience of motion is called "spatio-temporal saliency" and it is not only motion or lack of motion. Different types of motion attract more or less attention. For example, a gentle wave on the sea attracts less attention than a brick hurtling towards the camera. Likewise, motion salience is not just the time derivative of saliency. The things that attract your attention in movement can be very different to the things in the static space. For example, the same hurtling brick could be uninteresting when static. A sophisticated measure of salience would use a model of the human perception of motion saliency to produce the salience map. Motion and static salience would then be combined to produce an overall salience map.

Spatio-temporal salience is less heavily researched than spatial salience, and there appears to be two main research avenues:

Cognitive models: Based models of human on human spatio-temporal salience. The methods extend single-scene salience models with an additional time axis, to look for visual patterns over time (e.g. Mahadevan and Vasconcelos [30], Muddamsetty, Sidib'e, Tr'emeau and Meriaudeau 2014 [31]);

Spectral analysis models: By extending frequency domain use of phase data, Bian & Zhang (2009) [32] and Guo & Zhang (2010) [33] proposed spatio-temporal models in the spectral domain.

Spatio-temporal salience is made difficult by "grain" noise from the camera sensor (especially in low light) or compression noise from a codec. In high-noise environments, most of the movement between frames is pixel noise, so the spatio-temporal salience algorithm needs to be good at rejecting noise and recognizing genuinely salient motion.

2.10 Salience-Based Video Compression

Saliency calculations can be used to improve the video codec's compression ratio. If saliency can be calculated efficiently, with little additional processor overhead, it can be used in situations with limited processing power (e.g. mobile devices) or time constraints (e.g. live video). The speedy calculation of salience is particularly critical for the compression of live video, because many other forms of compression are too slow to compute live, so there is considerably more redundancy in the video that salience can remove.

Saliency calculation in the spatial domain are typically involves a substantial processing. Multiple calculations process the entire image several times, to accommodate different phenomena and scales.

Saliency maps are typically made up of multiple phenomena in the spatial domain. For example, Zhicheng Li, Shiyin Qin, Laurent Itti's [34] saliency model analyzes twelve low-level feature channels to produce multi-scale feature maps, which detect potentially interesting local spatial discontinuities using simulated center-surround neurons. The twelve feature channels are used to simulate the neural features which are sensitive to:

1. red/green color contrast
2. blue/yellow color contrast
3. temporal intensity flicker
4. intensity contrast
5. 0° orientation
6. 45° orientation
7. 90° orientation
8. 135° orientation
9. Up motion energy
10. Down motion energy
11. Left motion energy
12. Right motion energy Those features are then compared at multiple scales. Center-surround scales are obtained from dyadic pyramids with 9 scales, from scale 0 (the original image) to scale 8 (the image reduced by factor to 28=256 in both the horizontal and vertical dimensions). Six center-surround difference maps are then computed as point-to-point difference across pyramid scales, for each of the 12 features, yielding a total of 72 feature maps. Each feature map is additionally endowed with internal dynamics that provide a strong spatial within-feature and within-scale competition for activity, followed by within-feature, across-scale competition. All feature maps finally contribute to the unique scalar saliency map. The complexity of this method demonstrates the difficulty of calculating saliency in the spatial domain.

Other local pixel-based saliency calculation methods have been used by researchers (e.g. Bruce and Tsotsos [2]) to define visual saliency based on information theory or using graph-cut or grab-cub algorithms to refine borders of their saliency maps and count for salient object contours. These methods are also inaccurate and/or computationally intensive and they are not general-purpose, their accuracy depends on the choice of parameters.

Instead of calculating visual saliency in a local way, some other spatial saliency calculations are based on global rarity of image regions over the entire scene. Object-based theories of attention propose that humans attend to objects and high-level concepts. Inspired by these cognitive findings, some models (e.g., Judd et al. [22]) have used object detectors such as faces, humans, animals, and text, to detect salient locations. Some models address saliency detection in the spatio-temporal domain by employing motion, flicker, optical flow, or interest points learned from the image regions at fixated locations. These global search methods address a single phenomenon each, so a general-purpose salience algorithm would need to combine many such search algorithms at many sales, effectively creating the same heavy computational load that other salience calculations suffer from.

2.11 Frequency Domain Based Salience for Video Compression

The frequency domain has been used for calculating the visual saliency of video images, because human vision is attracted to certain patterns that can be more concisely described in the frequency domain.

Frequency domain representations of images may also be easier to search than spatial domain. Each point in the frequency domain is connected to every point in the spatial domain, so a known shape or pattern anywhere in the image can be found by examining a single location in the frequency domain (FIG. 9).

The difficulty with using frequency domain representations of a scene is that conversion to the frequency domain has typically been computationally-intensive. Fourier showed that any signal in the time domain can be represented in the frequency domain as a sum of sine waves with various amplitudes, frequencies and phases (FIG. 10).

As more sine waves are combined, the sum of those sine waves becomes an increasingly accurate representation of the time domain signal. For most time domain signals, the number of sine waves required for a perfect representation is infinitely long, so the frequency-domain representation of a time domain signal is an infinite train of sine waves.

In practice, infinite waves are not usable, so an approximation is made by sampling the continuous train of frequency waves into a discrete number of steps that are equally spaced in the frequency domain, called the Discrete Fourier Transform. In most modern equipment, conversion into the frequency domain is typically performed using a Fast Fourier Transformation (FFT), which rapidly computes frequency domain transformations by factorizing the Discrete Fourier Transform matrix into a product of sparse (mostly zero) factors. Fast Fourier Transforms are still computationally intensive, because each step operates on the residual of the previous, so the entire matrix must be calculated in order to find the area of interest. However, no algorithms with lower complexity are known. The need to calculate the entire FFT means that although the frequency domain representation of salience may be simple, the calculation needed is still too heavy for real-time calculation.

For most image compression purposes, Discrete Cosine Transformations (DCT) are used instead of FFT. The difference between a Discrete Fourier Transform (DFT) and a Discrete Cosine transformation (DCT) is that the Discrete Cosine Transform uses only cosine functions, while the Discrete Fourier Transform uses both cosines and sines. Using only cosines means that the DCT produces only real numbers, because all waves have the same phase, while a Fourier transform produce complex numbers that contain a phase and amplitude. DCT is often used in compression because it has a strong "energy compaction" property: in typical applications, most of the signal information tends to be concentrated in a few low-frequency components of the DCT, and small high-frequency components can be discarded (FIG. 11).

Several teams have explored frequency-domain saliency algorithms in images:

In 2007, Hou and Zhang [35] used the spectral components in an image to detect visual saliency. Bottom-up saliency is extracted from contrast differences, which can be obtained from amplitude or phase. Hou designed a simple and fast saliency detection approach by an amplitude spectral residual (SR). In this method, Hou assumed that the image information is made up of two parts: innovation and prior knowledge. Statistical singularities in the amplitude spectrum may be responsible for anomalous regions in the image, where salient objects pop up. In their method, the gist of the scene is represented with the average Fourier envelope and the differential spectral components are used to extract salient regions. They used a Spectral Residual approach to calculate saliency from the frequency domain. They discovered that an image's Spectral Residual of the log amplitude spectrum represents its "innovation" level. By using the exponential of the Spectral Residual instead of the original amplitude spectrum, and keeping the phase spectrum, performing the inverse Fourier transform produced the saliency map. The algorithm performed noticeably faster than comparable spatial domain saliency methods.

In 2012, Schauerte and Stiefelhagen [36] surveyed Quaternion-based spectral saliency detection for eye fixation prediction In 2013, Li, Levine, An and He [37] examined ways of combining spatial and frequency domain saliency predictions In 2015, Li, Duan, Chen, Huang and Tian [38] examined visual saliency from the phases of intermediate frequencies They reinterpret the concept of discrete Fourier transform from the perspective of template-based contrast computation and design the saliency detector under the assistance of prior knowledge obtained through both unsupervised and supervised learning.

Next to the research on frequency-domain algorithms in images, there is also a brief but clear lineage of papers on frequency domain based motion salience:

In 2008, Guo, Ma and Zhang [39] used the phase spectrum of the Fourier transform to calculate spatio-temporal (motion) saliency, and found that phase was more successful than other frequency domain methods, such as Spectral Residual, and had less computational overhead. Guo believed that the phase spectrum is a key factor to visual saliency, and that the salient region was often caused by the sudden change of phase. Computation effort is decreased because the saliency map can be calculated by Polar Fourier Transform regardless of the amplitude spectrum value. They calculated the Polar Fourier Transform of 2D images, and extended it further to a Quaternion Fourier Transform by representing each pixel as a quaternion composed of intensity, color and motion. The added 'motion' dimension allows the phase spectrum to work for videos as well as images.

In 2010, Guo and Zhang [40] made their Polar Fourier Transform method of calculating spatio-temporal saliency work at multi-resolutions, and applied it to applications in image and video compression. The Phase Spectrum of Quaternion Fourier Transform model can compute the saliency map of an image under various resolutions from coarse to fine, so a "Hierarchical Selectivity framework" based on the model is introduced to construct a tree structure representation of an image. With the help of Hierarchical Selectivity, a model called Multiresolution Wavelet Domain Foveation is proposed to improve coding efficiency and saliency calculation times in image and video compression.

In 2013 Li, Xue, Zheng, Lan and Tian [41] took the concept of a Quaternion Fourier Transform further, by including both the phase and amplitude data to calculate spatio-temporal saliency perception via "Hypercomplex frequency Spectral Contrast". One of the key reasons for modifying Guo and Zhang's method is the discovery that the phase spectrum alone is insufficient to calculate visual saliency. The frequency domain transforms and inverse transform implementation need the phase and amplitude of common information. The amplitude information states the energy spectrum of mutations and the phase information states the textural change in an image. Based on the amplitude spectrum, the saliency detection method has a salient object pre-position ability, but the integrity of the object is poor. Phase spectrum-based methods are sensitive to the boundary of a salient object. Too much emphasis on only amplitude or phase yields poor results, both need to be considered.

Their method has the following steps:
  Convert an image to the HSV (Hue, Saturation and Value or Brightness) color space, that corresponds more naturally to human perception is the color space, and captures some of the 3D structure inherent to real-world shaded objects;
  The HSV image is then blurred by 2D Gaussian on three level pyramids to eliminate fine texture details, as well as to average the energy of the image, to represent image pixels by pure quaternion (hypercomplex) in HSV color space;

Calculate the hypercomplex Fourier spectrum, which contains amplitude and phase information of the image in different scales;

Calculate the spectral contrast between the raw image and blurred image, then reconstruct these contrast maps using amplitude spectral and phase spectral under various scales of the raw image;

Normalize the reconstructed spectral contrast maps and use log-polar non-uniform sampling to obtain the final saliency map;

They then perform Quaternion Fourier Transform on it.

2.12 Salience-Based Video Compression

Once interesting regions are extracted, a number of strategies have been proposed to modulate video compression and encoding quality of interesting and uninteresting regions.

2.13 Blurring

One straightforward approach is to reduce the information in the input frames by blurring it according to the salience map. Only the regions of the image with attention are kept in high quality, while the other regions are all blurred. However, blurring yields obvious degradation of subjective quality in the low saliency regions.

2.14 Compression Modulation

Conventional rate control algorithms provide the same compression level for all macroblocks. Salience gives a chance to code the blocks unequally, compressing more heavily those blocks that not salient to improve the coding efficiency, or allocating more bits to salient areas to increase quality (FIG. 12).

Many algorithms have been proposed that use measures of visual saliency to compress blocks by varying amounts, depending on the saliency of those blocks. Perceptual quality can be used to modulate per-macroblock several different aspects of compression such as the quantization parameter
mode decision
number of referenced frames
accuracy of motion vectors
search range of motion estimation

2.15 Pre-Filters

The removal of information from non-salient areas does not have to be integrated into a codec. It can be implemented as a pre-filter that detects and tracks salient features, keeping them sharp, while non-salient features are lowpass filtered, causing an automatic and beneficial drop in bit rate. Because salience-based pre-filtering is performed as a pre-processing step, it can interface to any video encoder.

Pre-filters have some disadvantages—the macroblocks in the pre-filters are unlikely to perfectly match the codec's macroblocks, and there are many other aspects of the encoder that can't be influenced by a pre-filter, such as the sub-division of macroblocks into smaller macroblocks for fine-grained salience. There is also the possibility that the pre-filter may interfere with the codec's processing—for example changing object salience can change an object's appearance, making it unusable by a codec's motion prediction algorithms, which must send the differences in an object between frames as additional information.

2.16 Video Codecs

All industry-standard codecs share the same basic blocks (FIG. 13): They begin with a DCT block to transform the image into the frequency domain. A quantization block then reduces the resolution of those frequency components, then the Variable Length encoder removes entropy from the stream.

2.17 Motion Compensation

All modern video codecs also include motion estimation—each block of pixels in the current frame is compared with a set of candidate blocks of same size in the previous frame to determine the one that best predicts the current block. When the best matching block is found, a motion vector is determined, which specifies the reference block (FIG. 14).

The key idea for motion-compensation is to add predictive coding, to better compress the image, by predicting macroblocks. Motion compensation adds some complexity to the codec (FIG. 15):

Motion compensation is difficult to perform in the frequency domain, so the first step is to inverse-quantize and inverse-transform the compressed image, which then allows a motion estimation block to create a motion compensated prediction error in the pixel domain. For each block of current frame, a prediction block in the reference frame is found using motion estimation, and differenced to generate prediction error signal. This computation requires only a single frame store in the encoder and decoder. The resulting prediction error is transformed using DCT, quantized, entropy encoded using a Variable Length Coder (VLC) and buffered for transmission over a fixed rate channel.

The same compression blocks can be used for both within-frame (intra) and between-frame (inter). Between-frame compression subtracts the current frame from the previous frame, to operate on the difference between frames, while within-frame compression operates on the most recent frame (FIG. 16).

2.18 Industry Standard Codecs

Major initiatives in video coding lead to new codecs. A chronology of the most popular video codecs is:

H.261 (1990)—developed by the International Telecommunication Union (ITU) the coding algorithm uses Inter-picture prediction to remove temporal redundancy. A macro block, the basic unit of temporal coding, is used to represent a 16×16 pixel region. H.261 is intended for carrying video over ISDN in teleconferencing applications and is not suitable for usage in general digital video coding.

MPEG-1 (1991)—The first codec from the Moving Picture Experts Group (MPEG) was intended for storing movies on CD-ROM with on the order of 1.2 Mbits/s. It incorporates the following innovations:

Intra-coded (I-frames): Encoded as discrete frames (still frames), independent of adjacent frames;

Predictive-coded (P-frames): Encoded by prediction from a past I-frame or P-frame, resulting in a better compression ratio (smaller frame);

Bi-directional-predictive-coded (B-frame): Encoded by prediction using a previous and a future frame of either I-frames or P-frames; offer the highest degree of compression;

H.262/MPEG-2 (1994)—extending the compression technique of MPEG-1 to cover larger pictures and higher quality at the expense of higher bandwidth usage. MPEG-2 is designed for digital television broadcasting applications that require a bit rate typically between 4 and 15 Mbps, or storing video on DVD (Digital Video Disks) with on the order of 2-400 Mbits/s;

H.263/MPEG-4 Part 2 (1996)—uses an encoding algorithm called test model (TMN), which is similar to that used by H.261 but with improved performance and error recovery leading to higher efficiency. It is optimized for coding at low bit rates. H.263 is used for video coding for low bitrate video telephony over POTS2 networks with as little as 10 kbits/s allocated to video used at modem rates of from 14.4 to 56 kbits/s, where the modem rate includes video coding, speech coding, control information, and other logical channels for data. MPEG 4 has a feature called "Video Object Plane" that splits a video stream into foreground and background areas, defined by an alpha mask. The background information need only be sent once. The codec can automatically generate alpha masks by examining the video stream, or they can be produced semi-automatically by manually selecting an object of interest in the first frame;

H.264/MPEG-4 AVC/MPEG-4 Part 10 (2003)—had a target of doubling the coding efficiency in comparison to any other existing video coding standards for various applications. H.264 was approved by ITU-T in March 2003 (known also as MPEG-4 part 10). A goal was to provide enough flexibility to allow the standard to be applied to a wide variety of applications: for both low (as low as 8 kbits/s) and high (higher than 1 Mbits/s) bit rates, for low and high resolution video and with high and low demands on latency. The main features that improve coding efficiency are the following:

Variable block-size motion compensation
Motion vectors over picture boundaries
Multiple reference picture motion compensation
In-the-loop deblocking filtering
4×4 pixel small block-size transformation
Enhanced entropy coding methods (Context-Adaptive Variable-Length Coding (CAVLC) and Context Adaptive Binary Arithmetic Coding (CABAC))

VP8 (2008)—A traditional block-based transform coding format with a lot in common with H.264/AVC;

H.265/HVEC/MPEG-H Part 2 (2010)—JCT-VC organization, a collaboration between the ISO/IEC MPEG and ITU-T VCEG. It gives a 50% efficiency improvement over H.264;

VP9 (2012)—30% more efficient than ×264;

VP10/AV1 (estimated 2017)—The performance target is about 50% efficiency improvement over HEVC and VP9.

2.19 Improved Implementations of Standard Codecs

Not all video from the same codec is equal. Video compression standards specify the syntax and semantics of the compressed bit stream produced by the video encoder, and how this bit stream is to be parsed and decoded to produce a decompressed video signal. However, algorithms and parameter choices in the encoding are not specified, such as motion estimation, selection of coding modes, allocation of bits to different parts of the picture. These are left open and depend greatly on encoder implementation. However, it is a requirement that resulting bit stream from encoding be compliant to the specified syntax. The result is that the quality of standards-based video codecs depends greatly on the encoder implementation, even at the same bitrate. This explains why some implementations appear to yield better video quality than others.

2.20 Pre- and Post-Filters

Codecs often use prefilters such as video denoising, de-flicking and deshaking. Denoising and de-flicking normally maintain Peak Signal to Noise Ratio (PSNR) value while increasing visual quality. Deshaking greatly decreases PSNR, but increases visual quality. Postfilters show similar characteristics—deblocking and deringing maintain PSNR, but increase quality. Graining (suggested in H.264) increases video quality but decreases PSNR. All filters increase compression/decompression time. Some salience algorithms (e.g. EuclidIQ's IQ264) ha been implemented as pre-filters that operate on the video before it reached the codec.

2.21 Rate Control

The final data rate that the video is converted into can also be controlled. Variable bit rate commonly causes better visual quality marks than constant bit rate for the same average objective quality values (for example, PSNR) for sequences.

2.22 Macroblock Skipping

Motion Estimation looks for parts of previous frames that have not changed, and encodes them as a vector from their original reference location, plus differences. In the encoded stream, Motion Estimation creates three types of video frame:

I-frame—the reference frame containing all of the macroblocks;
P-frame—forward predicted pictures made from an earlier frame, mainly an I-frame, so require less data (typically 50% of an I-frame size);
B-frame—bidirectionally predicted pictures that use parts of earlier and later frames, less data than P-frames (typically 2D % of an I-frame size) because they can be predicted or interpolated from an earlier and/or later frame.

P-frames and B-frames are expressed as motion vectors and transform coefficients, allowing the codec to send a transformation of an image part instead of its content. But those motion vectors and transformations still occupy some of the bitrate.

For some macroblocks that are unchanged from the previous frame, it is possible to send Skip macroblocks, which include no motion vector or transformation. Skip blocks can also be used for large groups of macroblocks that are all transformed in the same way—the decoder will deduce the motion vector of a Skip-coded blocks from other blocks already decoded.

2.23 Video Compression Quality Assessment

In order to assess whether one video codec performs better than another, there needs to be a way to measure video quality. Video quality measures are an integral part of the development and assessment of video codecs, and are especially critical when considering new types of video compression based on human perception, that old quality measures may be unable to assess.

2.24 Subjective Quality

The simplest and most accurate way to measure video quality is to get people to observe it and score it. As video compression becomes more sophisticated and uses the perceptive properties of the human eye, human subjective quality rating becomes more important in the scoring of video quality, because synthetic models are unable to perfectly model human vision.

Turning subjective quality ratings into a reliable quality measure can be difficult, because subjective opinions vary and there are many ways of showing video sequences to participants and recording their opinions. To make subjective scores reliable, some presentation methods have been standardized, mainly in ITU-R Recommendation BT.500, which specifies a controlled presentation format for obtaining mean opinion scores from subjects.

Limited human attention time makes it difficult to use long sequences for subjective testing. Commonly, four ten-second sequences are used. The selection of sequence has an influence—sequences that are similar to the ones used by developers to tune their codecs perform better. Opinions of non-experts are usually used to rate video quality, because experts look at video in ways that are different from average users, resulting in quality scores that are not indicative of how consumers will experience the video quality.

The main problem with subjective quality tests is they are time-consuming, requiring the recruitment of 25 to 40 observers (depending on the test complexity) to get an acceptable precision on the mean opinion score. The process of designing and performing subjective video tests typically takes more than, a week.

2.25 Objective Quality

Synthetic measures provide video quality score without a large cohort of human video testers. Because there is no delay for human viewing, synthetic scores allow video codecs to be quickly developed—or even for quality assessment to be used within the codec to make dynamic adjustments between bit-rate and quality.

2.26 PSNR

Peak Signal to Noise Ratio (PSNR) is an engineering term for the ratio between the maximum possible power of a signal and the power of corrupting noise. PSNR performs a pixel-by-pixel comparison of a video frame before and after it has been through encoding and decoding. This type of before and after comparison is called "full reference". There are other types of quality estimation that use only the compressed image.

PSNR calculation first takes the Mean Square Error (MSE) of each bit. The maximum possible pixel value is squared and divided by MSE, and a logarithm taken of it to give PSNR.

Peak signal to noise ratio is used because it provides a simple measure of the distortion and noise added to in an image.

PSNR's weakness is that it does not model human vision well—some images distortions that are hardly noticed by the human eye produce large PSNR errors (e.g. Brightening an image), while other distortions that are very visible. These issues arise because PSNR has no concept of human perception. For example, a codec that uses salience to guide compression will have the same PSNR score as one that is unguided (it is just re-distributing the loss), but subjective scores will rate the salience-guided image as significantly higher quality. As modern codecs increasingly exploit human perception to discard information that is not perceived, PSNR scores have become less useful.

One variant of PSNR that has been proposed is Foveal PSNR, in which the PSNR scores are adaptively adjusted at the macroblock level according to the relative importance (obtained from the attention map) of each macroblock. However, this method is limited only to lab video samples, because the attention map must be obtained by eye tracking of subjective viewers. Novel video will have no attention map.

2.27 SSIM

Structural Similarity attempts to better accommodate human perception by calculating a measure of "structural similarity" that in some ways models human perceived quality. Rather than calculate absolute error, SSIM considers image degradation as perceived change in "structural information" which is the idea that pixels have strong interdependencies, especially when they are spatially close. These dependencies carry important information about the structure of the objects in the visual scene. SSIM also incorporates perceptual phenomena, such as "luminance masking" and "contrast masking". "Luminance masking" is a phenomenon whereby image distortions tend to be less visible in bright regions. "Contrast masking" is a phenomenon whereby distortions become less visible where there is significant activity or "texture" in the image.

SSIM is comprised of a weighted combination of three factors:
Luminance—High values for pixels are weighed more. The luminance of each point is twice the product of average x and y over the sum of the square of average.
Contrast—Locally unique pixel values are weighed more. The contrast of each point is twice the product of variance x and y over the sum of the square of average.
Structure—Here it is determined if the values change with their neighbors. The structure of each point is the covariance of x and y over the product of the variance x and y.

One variant of SSIM, called Multi-Scale SSIM (MSSIM), calculates these scores over multiple scales through a process of multiple stages of sub-sampling, designed to mimic the multiscale processing in the early vision system. The performance of MSSIM correlates very highly to human judgments, as measured on image quality databases. Most competitive object image quality models are some form or variation of the MSSIM concept.

Although MSSIM has some advantages, it also has issues that limit its usefulness:
MSSIM is more complex to calculate than PSNR.
Perhaps most significantly, MSSIM is for static images, not for video. Video has more correlation between-frames than within-frame, so most compression is performed between frames, meaning that MSSIM does not measure the majority of distortion. There is no correlation between motion saliency and SSIM.
MSSIM has no concept of salience—it can identify structural relationships, but it is unable to say whether those relationships are salient. This is a critical shortcoming when testing salience-based compression algorithms, which keep the average distortion levels the same, but distribute the bits unevenly to provide better quality in salient areas. MSSIM typically reports no improvement from salience-based bit distribution, while subjective testing reports significant improvements.
MSSIM is complicated, which makes it difficult to develop codecs against. Codecs are often optimized incrementally and iteratively by changing parameters and testing them against an objective measure. For simple measures like PSNR, it is readily apparent why a score has become better or worse. For complicated measures, it can be difficult to know why a scene's score has changed.

Many additional types of objective (including human vision-based objective) quality assessment methods have been proposed. However, the research results of the video quality experts group (VQEG) show that there is no objective measurement which can reflect the subjective quality in all conditions.

2.28 Quality Curves

Most video codecs have a non-linear relationship between bit-rate and quality—each increase in bitrate has less effect on the quality. This nonlinear relationship forms a "quality curve" that describes how the codec reacts to higher and lower bitrates. The compression curves are what is used to compare codecs (FIG. 17).

2.29 Closed Loop Prediction

Objective quality measures can be used in a closed-loop fashion, to modulate compression. If the quality measure knows that compressing one area will have an impact on quality, the codec can be directed to compress that area less, to maintain subjective quality. Closed-loop video compression, with objective quality as feedback was suggested by Caviedes and Ali in 2005 [42].

Quality estimation and salience can be seen to be the same algorithm: perfect measures of quality would enable optimum compression to be used at all parts of the image.

2.30 Industry Problems

The video codec industry faces several problems, and new codecs are regularly introduced in an effort to better solve these issues.

2.31 Increasing Use of Video

Video internet traffic is increasing by an order of magnitude. The quantity of internet traffic is expected to increase 100-fold from 2005 to 2020 (Cisco). Video will account for most of that increase: IP video traffic will be 82% of all consumer Internet traffic by 2020, up from 70 percent in 2015 (Cisco). Between 2011 and 2013, average online video viewing grew by 6 mins/person/day.

2.32 Video Resolutions are Increasing

Video frame size is increasing, as larger, higher definition screens are used.

It is not just the resolution of frames that is increasing, but also larger colour spaces are being used.

New screen technologies such as 360 degree and stereo video further increase the data and resolution demands.

2.33 Small Bandwidth

Internet traffic is changing to be predominantly over mobile networks: smartphone internet traffic will exceed PC traffic by 2020 (Cisco). Patterns also show a trend towards viewing video on mobile devices—Ericsson predict by 2019 IP traffic from mobile devices will far exceed that from wired devices & video consumption will account for >50% of mobile traffic. But mobile data speeds are typically slower than those of wired networks, so the average bandwidth per video is not increasing quickly. Realtime video is further constrained by the asymmetrical nature of most cellular communication links, which provide a wider download than upload link.

2.34 Realtime Video has Lower Compression

Video codecs are less efficient at encoding realtime video because many codec operations, such as motion estimation, are too computationally heavy to perform in realtime. But live video is becoming an increasingly large proportion of the internet traffic, due to the availability of video call hardware and software. Much of this live video is being encoded on mobile devices, which have lower computation capability.

2.35 the Time Taken to Develop New Codecs is Increasing

New codecs typically offer better compression rates, by employing more sophisticated algorithms. As these codecs become more sophisticated, they take longer to develop. The average time between new versions of a codec has increased from 2 years to 5 years.

2.36 Computation Effort is Increasing

As codecs become more sophisticated, the calculations they perform per pixel increase. Modern codecs may perform searches, transformations and modelling in order to reduce the bit-rate. The increased effort per pixel, combined with the increase in video resolutions, makes video encoding too demanding to be performed in real-time on most modern CPUs. Institutions that handle a lot of video typically have "transcoder" farms that spend a lot of effort encoding videos, to encode them at optimum compression.

2.37 Metrics for Codecs are Becoming More Difficult

Stating a codec's efficiency has become more difficult as s codecs become more sophisticated. Some new codecs are optimized for human vision or for certain content types (e.g. sports), so they perform poorly on synthetic testing. For testing they require large cohorts of human observers watching video that is a representative of the most popular types of content.

2.38 Hardware Compatibility

Video codecs represent a significant load on a processor, so many devices include hardware video codec accelerators, especially in low-power devices (e.g. televisions, mobile phones). These hardware video accelerators become a barrier to the introduction of new video encoding methods, because new codecs are incompatible with the large base of installed accelerator hardware.

2.39 Software Compatibility

Most browsers and operating systems contain video codecs to enable playback of videos. Software can take many years to adopt new codecs, because of a chicken-and-egg situation where there is no codec to play the video, so video content is not encoded in that codec, which reduces the need to adopt the codec, and so on.

2.40 Existing Video Content

Most video content has already been encoded in one of the existing video formats. Content owners may either not have the original high-quality versions of video, be reluctant to incur the cost to re-encode video. Aside from motivation, they may find that previous encoders have introduced visual artefacts that interfere with the compression by a new codec, or that the old codec, which had a lower compression ratio, had required quality degradation to achieve the desired bitrate.

2.41 Very Low-Bitrate Video

The amount of low-resolution/low-quality video is increasing—parts of websites, advertisements and user interfaces that used to be static images, are displaying video content. However most video encoders perform poorly at low bitrates. Given a very low bitrate, many encoders will distort the entire image, making it unacceptable quality.

Summarizing, methods described as prior art above still are not used on a large scale in unconstrained real-world real-time applications, because with current processing power with such methods it is difficult to achieve an acceptable robustness and speed of the object detection and image processing with the aim of improving video compression. This method describes calculations which can achieve both the required robustness and speed.

BIBLIOGRAPHY

[1] Mishra A K, Aloimonos Y, Cheong L F, Kassim A (2012). Active visual segmentation. IEEE transactions on pattern analysis and machine intelligence, 34(4), 639-653.

[2] Bruce N, Tsotsos J (2006). Saliency based on information maximization. Advances in neural information processing systems, 18, 155.

[3] Ma Y-F, Zhang H-J. Contrast-based image attention analysis by using fuzzy growing. Proceedings of the eleventh ACM international conference on Multimedia—MULTIMEDIA '03, 2003. doi:10.1145/957092.957094.

[4] L. Itti, C. Koch, & E. Niebur (1998). A Model of Saliency-Based Visual Attention for Rapid Scene Analysis. IEEE Transactions on Pattern Analysis and Machine Intelligence 20(11):1254-1259.

[5] C. Koch & S. Ullman (1985). Shifts in selective visual attention: towards the underlying neural circuitry. Human Neurobiology 4:219-227.

[6] O. Le Meur, P. Le Callet, D. Barba, & D. Thoreau (2006). A coherent computational approach to model bottom-up visual attention. IEEE Transactions on Pattern Analysis and Machine Intelligence. 28(5):802-817.

[7] Sophie Marat, Tien Ho Phuoc, Lionel Granjon, Nathalie Guyader, Denis Pellerin, et al. (2009). Modelling spatio-temporal saliency to predict gaze direction for short videos. International Journal of Computer Vision, Springer Verlag, 2009, 82 (3), pp. 231-243.

[8] Bruce, N. D. and Tsotsos, J. K., (2005), May. An attentional framework for stereo vision. In Computer and Robot Vision, 2005. Proceedings. The 2nd Canadian Conference on (pp. 88-95). IEEE.

[9] Mancas, M., Gosselin B., MA CQ B., (2007). A Three-Level Computational Attention Model. Proceedings of ICVS Workshop on Computational Attention & Applications (WCAA—2007).

[10] A Borji, D N Sihite, L Itti (2012) Quantitative Analysis of Human-Model Agreement in Visual Saliency Modeling: A Comparative Study, IEEE Transactions on Image Processing (TIP)

[11] Hou X, Zhang L. Saliency Detection: A Spectral Residual Approach. 2007 IEEE Conference on Computer Vision and Pattern Recognition, 2007. doi:10.1109/cvpr.2007.383267.

[12] Torralba, A (2003). Contextual Priming for Object Detection International Journal of Computer Vision (2003) 53: 169. doi:10.1023/A:1023052124951

[13] L. Itti & P. Baldi (2006). Bayesian Surprise Attracts Human Attention. In: Advances in Neural Information Processing Systems, Vol. 19 (NIPS*2005), Cambridge, Mass.: MIT Press.

[14] Harel, J., Koch, C. and Perona, P., (2006, December). Graph-based visual saliency. In NIPS (Vol. 1, No. 2, p. 5).

[15] Avraham, T., & Lindenbaum, M. (2010). Esaliency (extended saliency): Meaningful attention using stochastic image modeling. IEEE Transactions on Pattern Analysis and Machine Intelligence, 32, 693-708

[16] Li, L. J., Su, H., Fei-Fei, L. and Xing, E. P., (2010). Object bank: A high-level image representation for scene classification & semantic feature sparsification. In Advances in neural information processing systems (pp. 1378-1386).

[17] Hamed Rezazadegan Tavakoli, Esa Rahtu, Janne Heikkilä (2011), Fast and efficient saliency detection using sparse sampling and kernel density estimation, Proceedings of the 17th Scandinavian conference on Image analysis, May 1, 2011, Ystad, Sweden

[18] D. Gao and N. Vasconcelos, (2004) Discriminant Saliency for Visual Recognition from Cluttered Scenes, Proceedings of Neural Information Processing Systems (NIPS), Vancouver, Canada, 2004.

[19] Hou, X. and Zhang, L., (2007), June. Saliency detection: A spectral residual approach. In Computer Vision and Pattern Recognition, 2007. CVPR '07. IEEE Conference on (pp. 1-8). IEEE

[20] Kienzle, W., Wichmann, F. A., Schölkopf, B. and Franz, M. O., (2007). A nonparametric approach to bottom-up visual saliency. Advances in neural information processing systems, 19, p. 689.

[21] Peters, R. J. and Itti, L., (2007), June. Beyond bottom-up: Incorporating task-dependent influences into a computational model of spatial attention. In Computer Vision and Pattern Recognition, 2007. CVPR'07. IEEE Conference on (pp. 1-8). IEEE.

[22] Judd, T., Ehinger, K., Durand, F. and Torralba, A., (2009), September. Learning to predict where humans look. In Computer Vision, 2009 IEEE 12th international conference on (pp. 2106-2113). IEEE.

[23] Cerf, M., Frady, E. P. and Koch, C., (2008), March. Using semantic content as cues for better scanpath prediction. In Proceedings of the 2008 symposium on Eye tracking research & applications (pp. 143-46). ACM.

[24] Seo, H. J. and Milanfar, P., (2009). Static and space-time visual saliency detection by self-resemblance. Journal of vision, 9(12), pp. 15-15.

[25] Garcia-Diaz, A., Fdez-Vidal, X. R., Pardo, X. M. and Dosil, R., (2009), September. Decorrelation and distinctiveness provide with human-like saliency. In International Conference on Advanced Concepts for Intelligent Vision Systems (pp. 343-354). Springer Berlin Heidelberg.

[26] Kootstra, G., Nederveen, A. and De Boer, B., (2008). Paying attention to symmetry. In British Machine Vision Conference (BMVC2008) (pp. 1115-1125). The British Machine Vision Association and Society for Pattern Recognition

[27] Goferman, S. and Zelnik, L., (2010), June. L. manor, and A. Tal. Context-aware saliency detection. In CVPR (Vol. 1, No. 2, p. 3).

[28] Wolfe, J. M., (1994). Visual search in continuous, naturalistic stimuli. Vision research, 34(9), pp. 1187-1195.

[29] Kahneman, D., Treisman, A. and Gibbs, B. J., 1992. The reviewing of object files: Object-specific integration of information. Cognitive psychology, 24(2), pp. 175-219

[30] Mahadevan, V., Li, W., Bhalodia, V. and Vasconcelos, N., (2010), June. Anomaly detection in crowded scenes. In Computer Vision and Pattern Recognition (CVPR), 2010 IEEE Conference on (pp. 1975-1981). IEEE

[31] Muddamsetty, S. M., Sidibé, D., Trémeau, A. and Mériaudeau, F., (2014), August. Spatio-Temporal Saliency Detection in Dynamic Scenes using Local Binary Patterns. In Pattern Recognition (ICPR), 2014 22nd International Conference on (pp. 2353-2358). IEEE.

[32] Bian, P. and Zhang, L., 2008, November. Biological plausibility of spectral domain approach for spatiotemporal visual saliency. In International conference on neural information processing (pp. 251-258). Springer Berlin Heidelberg.

[33] Guo, C. and Zhang, L., 2010. A novel multiresolution spatiotemporal saliency detection model and its applications in image and video compression. IEEE transactions on image processing, 19(1), pp. 185-198.

[34] Li, Z., Qin, S. and Itti, L., 2011. Visual attention guided bit allocation in video compression. Image and Vision Computing, 29(1), pp. 1-14.

[35] Hou, X. and Zhang, L., 2007, June. Saliency detection: A spectral residual approach. In Computer Vision and Pattern Recognition, 2007. CVPR'07. IEEE Conference on (pp. 1-8). IEEE.

[36] Schauerte, B. and Stiefelhagen, R., 2012. Quaternion-based spectral saliency detection for eye fixation prediction. In Computer Vision—ECCV 2012 (pp. 116-129). Springer Berlin Heidelberg.

[37] Li, J., Levine, M. D., An, X., Xu, X. and He, H., 2013. Visual saliency based on scale-space analysis in the frequency domain. IEEE transactions on pattern analysis and machine intelligence, 35(4), pp. 996-1010.

[38] Li, J., Duan, L. Y., Chen, X., Huang, T. and Tian, Y., 2015. Finding the secret of image saliency in the frequency domain. IEEE transactions on pattern analysis and machine intelligence, 37(12), pp. 2428-2440.

[39] Guo, C., Ma, Q. and Zhang, L., 2008, June. Spatio-temporal saliency detection using phase spectrum of quaternion fourier transform. In Computer vision and pattern recognition, 2008. cvpr 2008. ieee conference on (pp. 1-8). IEEE.

[40] Guo, C. and Zhang, L., 2010. A novel multiresolution spatiotemporal saliency detection model and its applications in image and video compression. IEEE transactions on image processing, 19(1), pp. 185-198.

[41] Li, C., Xue, J., Zheng, N., Lan, X. and Tian, Z., 2013. Spatio-temporal saliency perception via hypercomplex frequency spectral contrast. Sensors, 13(3), pp. 3409-3431.

[42] Caviedes, J. E. and Ali, W. S. I., 2005, September. Closed-loop video processing for objective quality optimization. In Signal Processing Conference, 2005 13th European (pp. 1-4). IEEE.

SUMMARY OF THE INVENTION

The present method for the video compression can be applied where kernels are used in the frequency domain. It is not applicable to methods that are based on the analysis of pixel information in the spatial domain without transforming the image data into a frequency domain. This method is especially applicable in situations where objects within the images to be compressed need to be detected or a map of visual saliency needs to be created from the images in a video stream in real-time on a device, or network connected device, with the objective of compressing the video stream.

Generally, the method of the present invention has the process detailed in the following: objects or visual saliency are detected using features extracted in the frequency domain. These features have been obtained by transforming the original image to the frequency domain and multiplying this transformed image information by one or more kernels in the frequency domain.

In the process, a number of features are first selected and, after, in an offline learning phase wherein parameters such as for the kernels and the features layout are optimized, the best parameter settings are selected. The set of features so describes the model in a frequency domain for a generic object or visually salient object.

In the following just the descriptions "classifier" and "objects" are often used. What is meant is "classifier and/or visual saliency". It will be clear that a visual saliency model will be a higher-level, more generic model than a classifier. For example, a classifier might be trained to recognize objects like faces. While for a visual saliency model, a face is just one of the objects of interest. It will be clear to the experts in the field that the application of the disclosure of this method will be exactly the same for the creation of a classifier or visual saliency model. Hence in this disclosure the terms "classifier" and "objects" suffice to also describe visual saliency models used for video compression.

In a deeper detail, the method for extracting and using features in the frequency domain comprises the steps of:
  obtaining a digital image defined through data in a spatial domain;
  transferring a sparse fraction of the total frequency domain data of the image data to the frequency domain using 2D variation of a L-Transformation;
  applying to the transformed frequency domain one or more sparse zones covering together a fraction of the frequency domain, and one or more filtering kernels at least partially overlapping said sparse zones;
  performing a multiplication between the transformed frequency data within each sparse zone and said kernels, combining the results in single values, each representing a corresponding extracted feature;
  using the output of the extracted features to create a classifier and/or a visual saliency model, therefore obtaining a means to modulate video compression when used in combination with a video codec;
  varying the parameters of said sparse zones and/or the kernels, repeating the process of multiplication and extraction until a predetermined accuracy is achieved.

It will be clear to an expert in the field of video codecs that there are several possibilities to use as the digital image input:
  The entire image is transformed
  Segments of the image are transformed
  Each macroblock input of the image, as defined by the codec, is transformed It will also be clear that the size of the digital input does not change the claims disclosed here. The method can be used for any input size, for example the size used for macroblocks of a video codec.

In view of the above, the method for image processing and video compression according to the present invention is defined in appended claim 1.

Further details of the method, leading to additional advantages, are defined in the dependent claims.

The present method is hence capable to greatly increase the processing speed of object detection and image processing methods, at the same time increasing the accuracy thereof.

As explained above, a huge need is felt for new methods able to increase the speed of object detection and image processing techniques. This speed increase should render the object detection and calculation of visual saliency fast enough to work in the background inside the latest generation of mobile devices and other similar devices.

Apart from use on the latest generation of mobile devices, in anticipation of future trends such as wearable hardware, the algorithms need to be able to work outside of the main personal computer operating systems and mobile operating systems and thus be programmable on processors and re-programmable hardware such as field-programmable gate arrays. The methods also need to be built up of algorithms, which can take advantage of the latest hardware developments on personal computers and mobile devices such as multi-cores and powerful graphical processing units (GPU's).

In this connection, the use of calculations in the frequency domain naturally lends itself to respond to the need for faster calculations for several reasons. This method allows for such parallel processing. It is well known by experts in this field that the many variants of FFT are not fit for programming on a processor.

The standard frequency domain theory of Fourier states that any signal, in our case digital images, can be expressed as a sum of a series of sinusoids. In the case of image processing, these are sinusoidal variations in brightness across the image.

A sinusoidal function can encode:
  the spatial frequency
  the magnitude
  the phase The spatial frequency is the frequency across the space with which the brightness modulates.

The magnitude of the sinusoidal corresponds to its contrast, or the difference between the darkest and the brightest peaks of the image. The phase represents how the wave is shifted relative to the origin.

A Fourier transform encodes not just a single sinusoid, but a whole series of sinusoids through a range of spatial frequencies from zero until the "Nyquist frequency", that means the highest spatial frequency that can be encoded in the digital image, which is related to the resolution, or total number of the pixels.

The Fourier transform encodes all of the spatial frequencies present in an image simultaneously.

The Nyquist frequency is ½ of the sampling rate of a discrete signal processing system, in our case the digital image.

The underlying principle behind the Fourier transformation used for image processing is that each pixel affects all frequencies, and each frequency affects all pixels.

The intuition behind the method disclosed here is that the position of said contrasts in the spatial domain is encoded by sinusoids in the frequency domain. Certain contrasts in the spatial domain are only affected by certain sinusoids in the frequency domain. For shapes, which are defined by a combination of contrasts in the spatial domain, it means that this shape is captured by a unique combination of positional information in the frequency domain. And it means that movement is captured by a unique change of positional information in the frequency domain.

Therefore, we can use the capturing of a specific information or change of information in the frequency domain for the detection of specific objects.

Working in the frequency domain allows for much easier calculations as multiplications with filters and other similar calculations with matrices are simple component-wise multiplication, unlike in the spatial domain, where it is a convolution between two functions, which is computationally more expensive.

Therefore, the frequency domain allows for a computationally easy use of a sparse, small, part of the frequency domain information for object detection.

Sparse zones, as well as the kernels operated as filters in the frequency domain, will be hereinafter explained and detailed.

Working fully in the frequency domain without requiring the calculations to transform the image back to the spatial domain after the frequency domain calculation also allows an added flexibility in the choice of the mathematics that perform the transformation into the frequency domain

BRIEF DESCRIPTION OF THE DRAWINGS

Further features and advantages of the present method will become more apparent by the following description of a preferred embodiment thereof, given by reference to the annexed drawings wherein.

DESCRIPTION OF THE EMBODIMENTS

Figure 1:
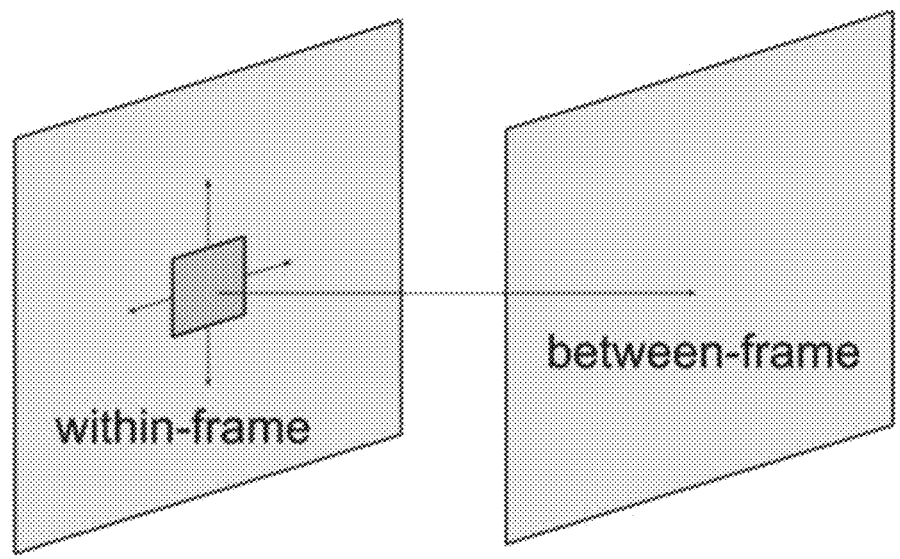
FIGS. 1 to 17 illustrate video compression methods according to the prior art (see above)
Figure 2:
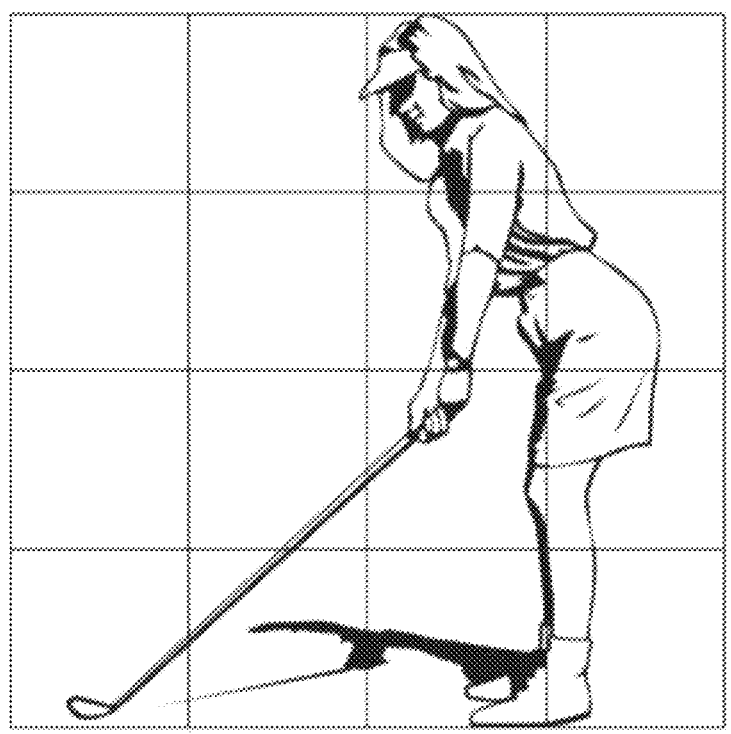
Figure 3:
Figure 4:
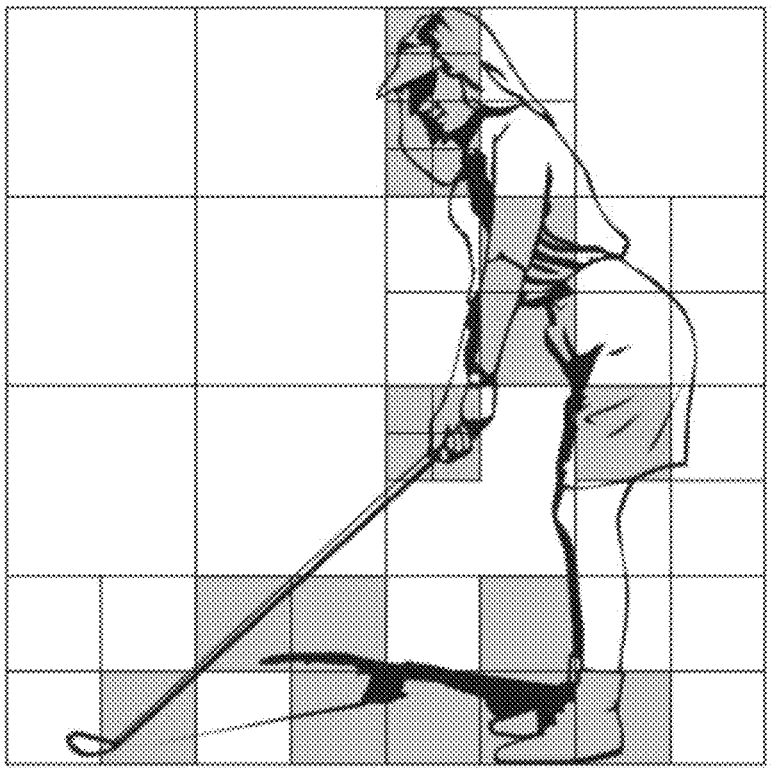
Figure 5:
Figure 6:
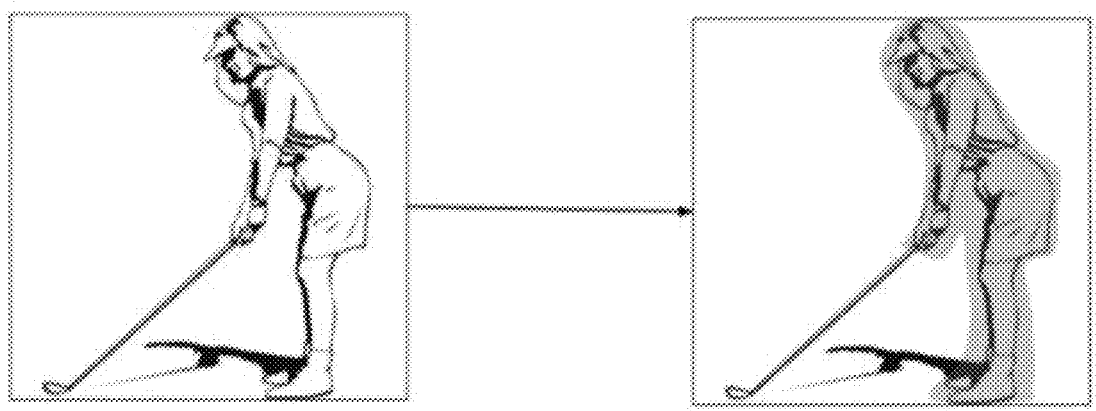
Figure 7:
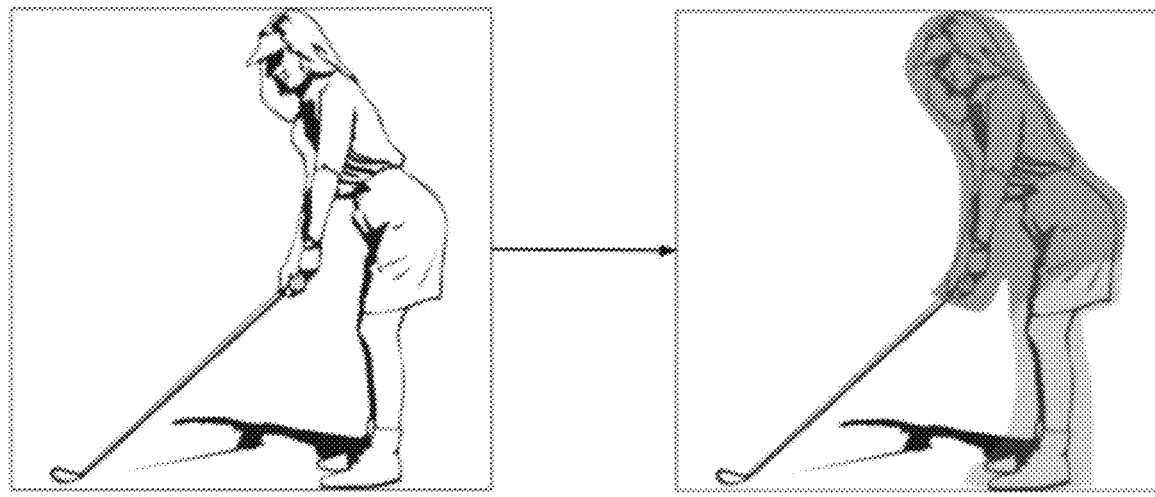
Figure 8:
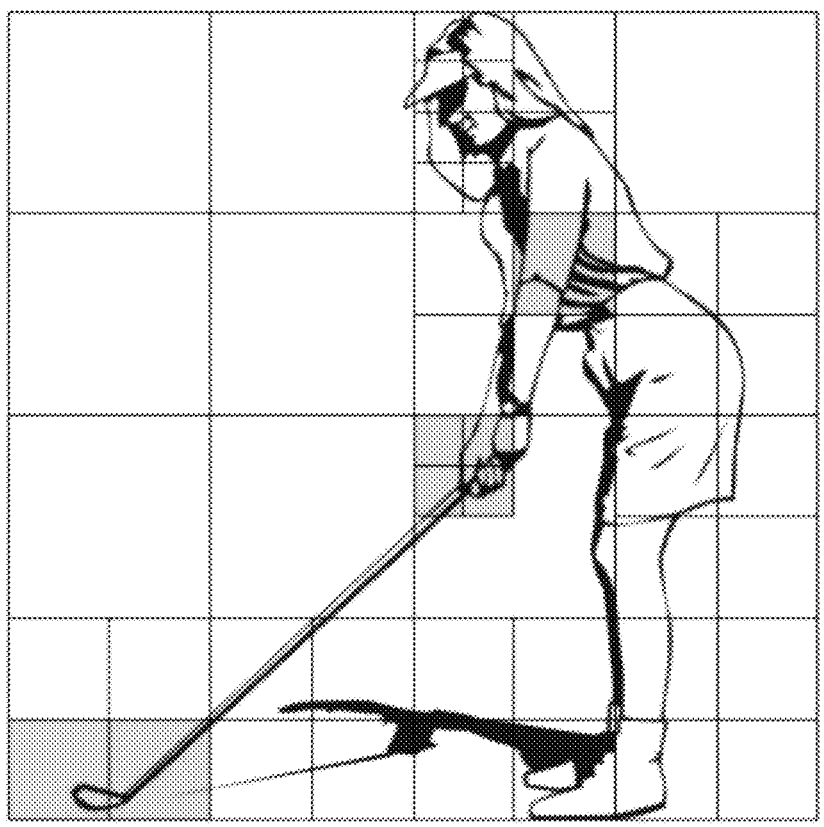
Figure 9:
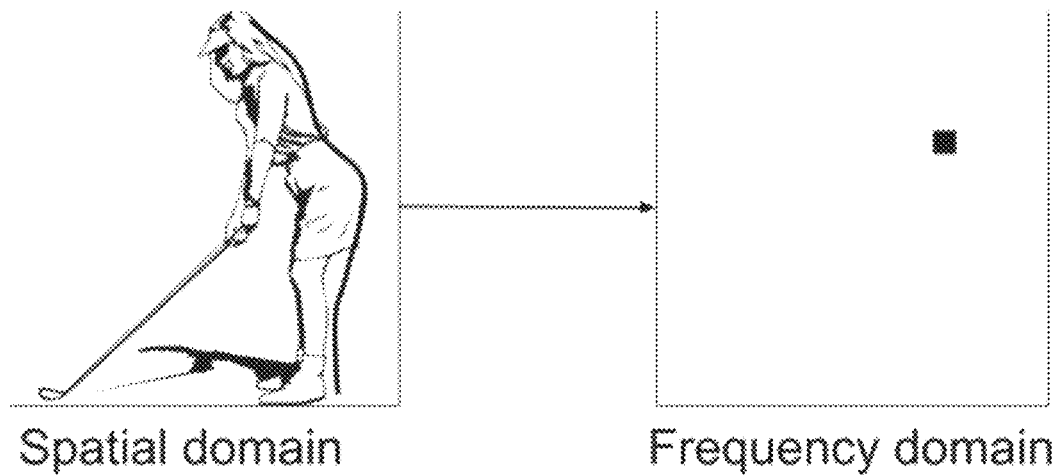
Figure 10:
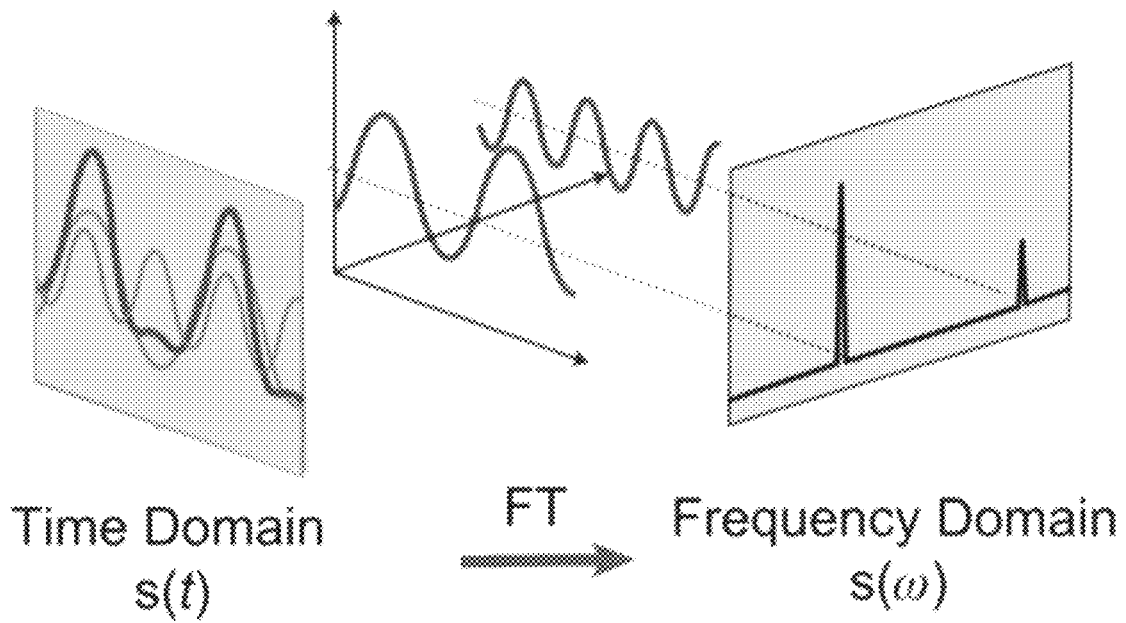
Figure 11:
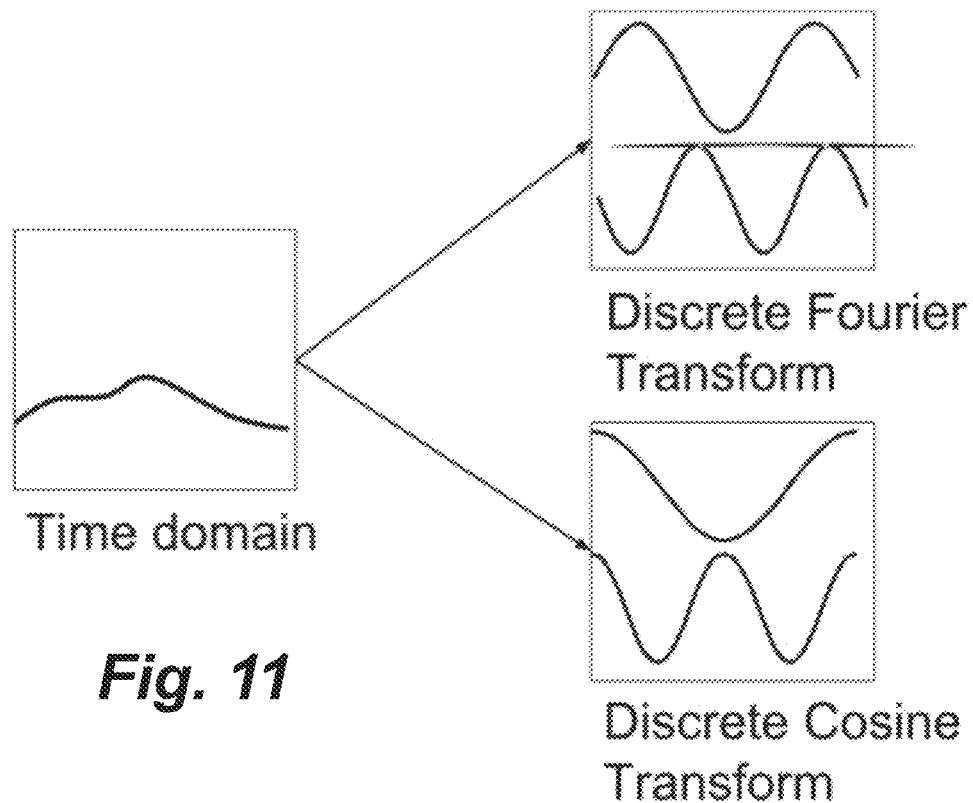
Figure 12:
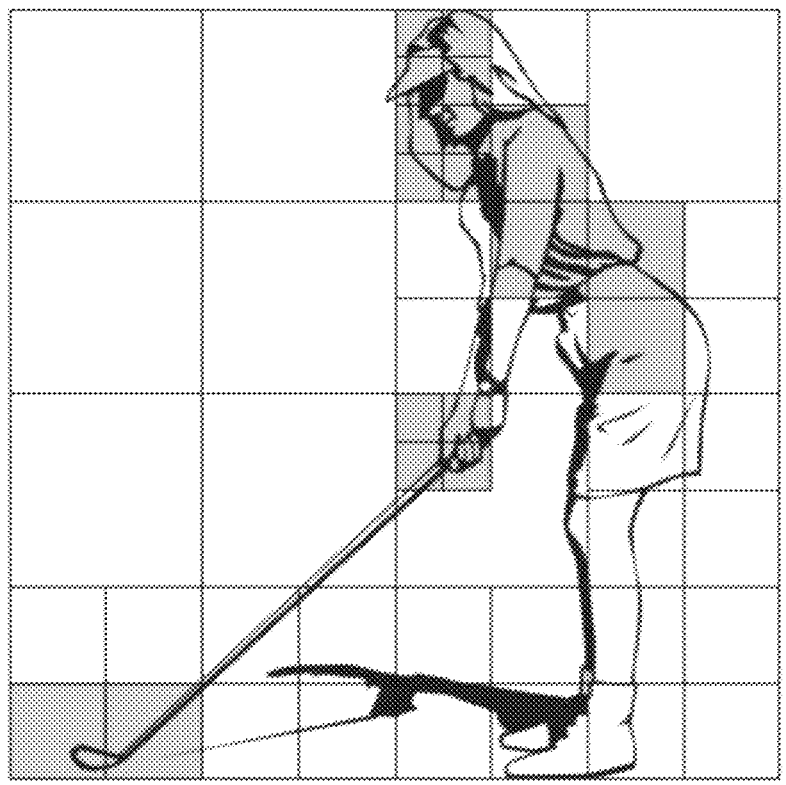
Figure 13:
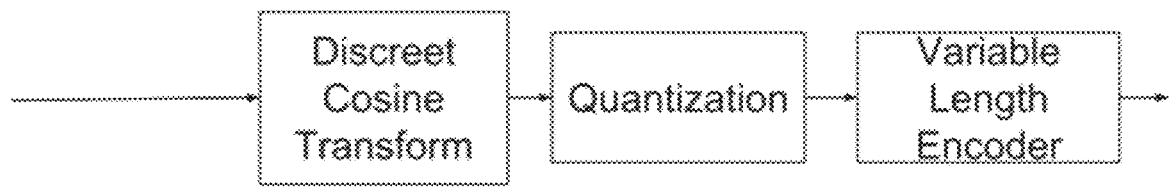
Figure 14:
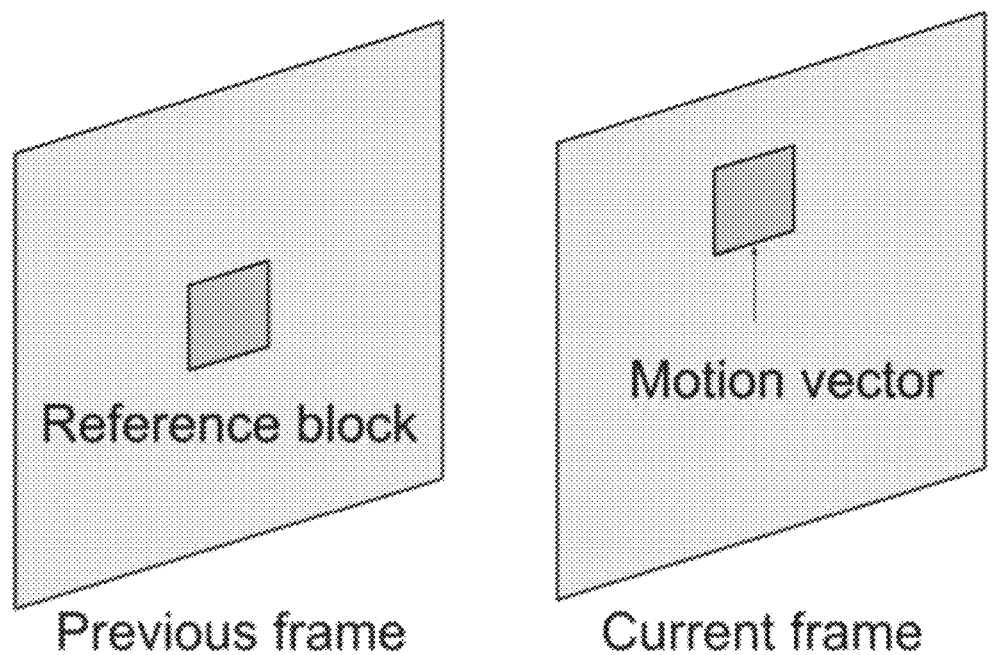
Figure 15:
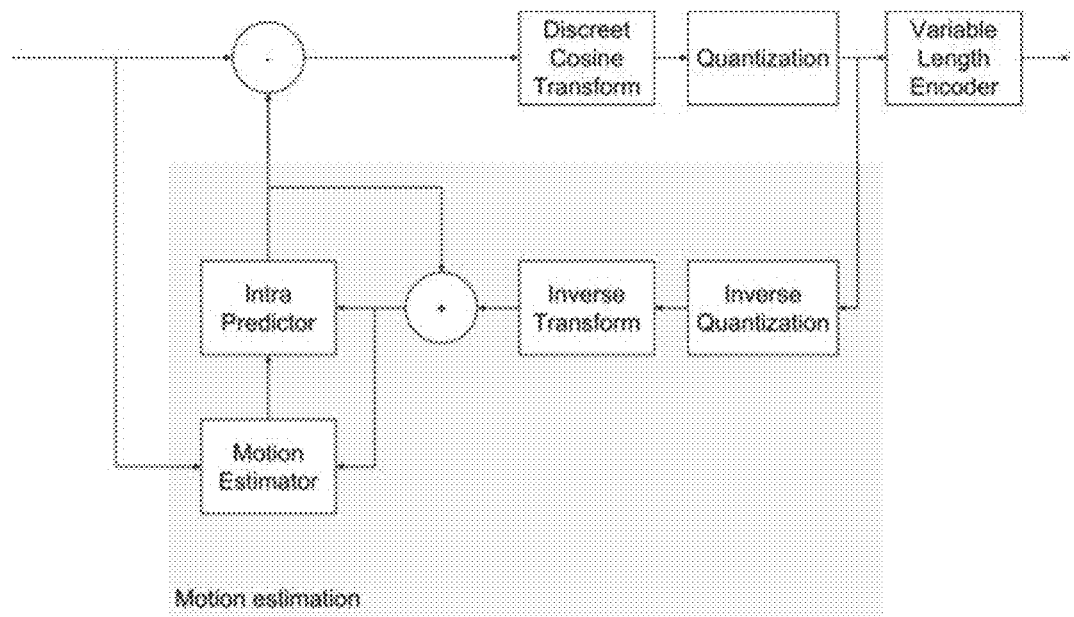
Figure 16:
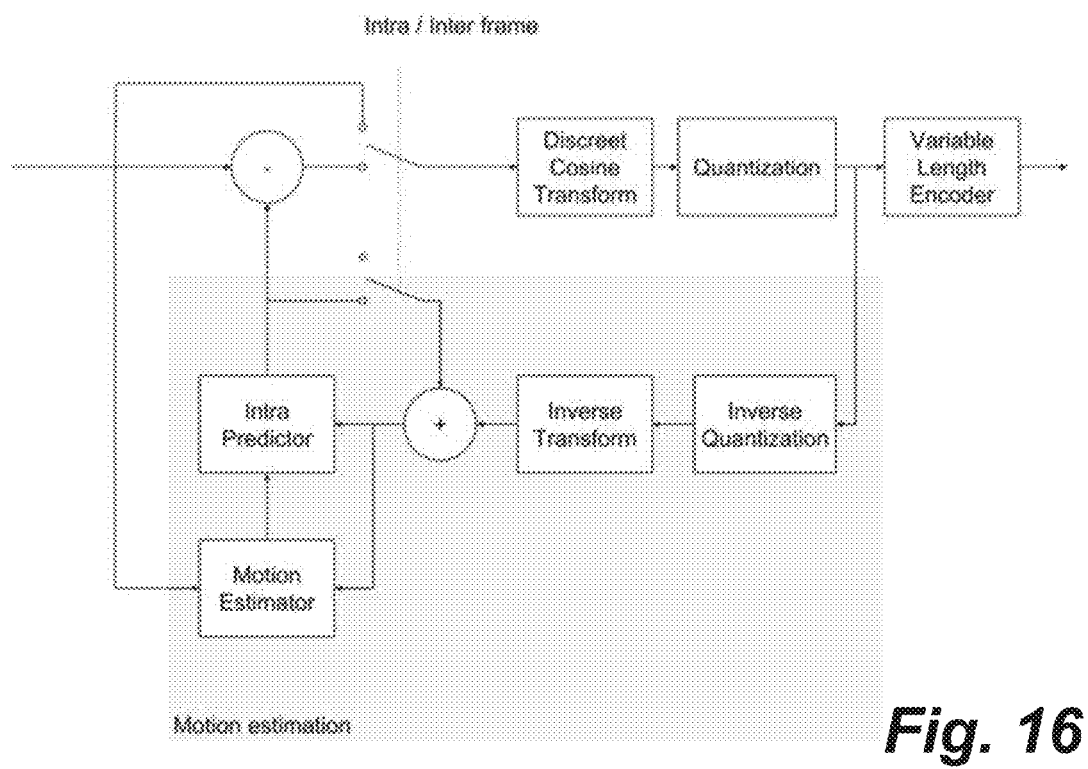
Figure 17:
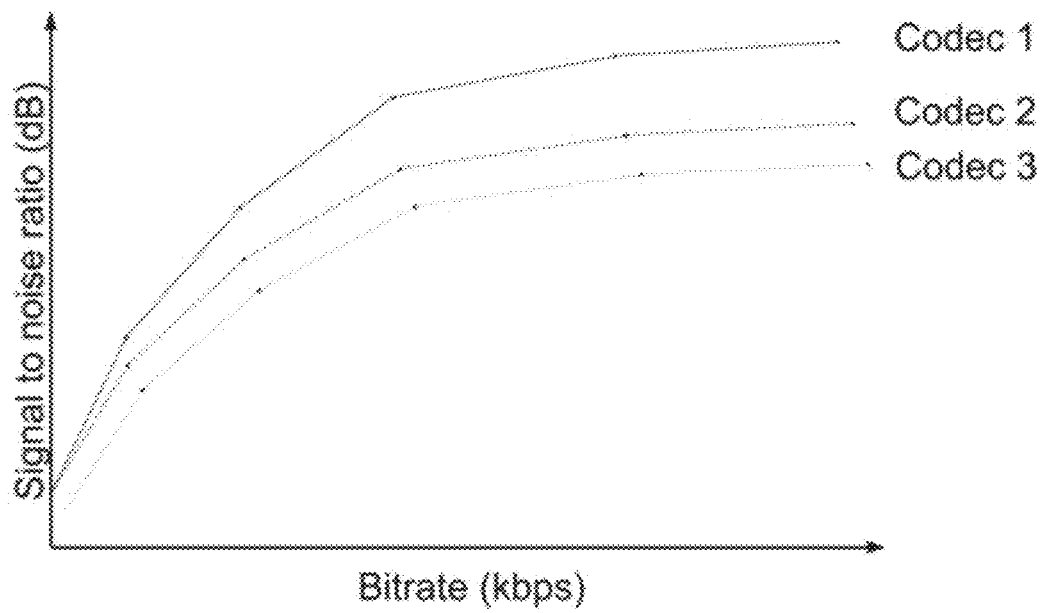

In the following, an embodiment of the method according to the present invention will be detailed with reference to the accompanying figures.

It is apparent that what is herein described with reference to a video stream, i.e. a succession of a series of image frames having a certain rate, also applies to any succession of single images, being equivalent to the frames of a video stream, and to one single image being equivalent to a single frame.

In the first step, a search logic can be used on the full input image to generate an input frame for the calculations of this method. The search logic can for example be the whole image or a subset of the image. It should be clear that many types of search logic are possible, but that from the point of view of the method disclosed here the calculations or claims do not change, just the image input for the transformation changes. It will also be clear that a single frame can have multiple inputs for multiple calculations each of which are processed as described in the claims.

The input or inputs taken from the frame or sequence of frames are then extracted in the frequency domain. The data within the frequency domain data of the frame is then processed to detect the content. The method described here leaves open the classification used, what instead is underlined in this method is an improvement in the quality and type of data used for the classification of choice.

As mentioned above, the method described is particularly effective at the detection of objects and processes which are especially or even exclusively in the temporal data of a video stream. It shall be explained herein how multiple frames can be combined into a single input for the detection.

The detection will move to the next frame or sequence of frames of the video stream when either the object has been detected or a repetition of the search logic fails to find the object within the image. It should be clear that the search logic can be made to be adaptive, based on which object were found in the previous frame.

In the known art, processing an image in the frequency domain is generally done using a variant of the Fast Fourier Transform (FFT), but the present method neither uses FFT or its variants, for example Discrete Cosine Transform (DCT), nor uses a Discrete Fourier Transformation (DFT).

However, to highlight the differences between the conventional image processing and the present method, a generic overview of FFT and DFT is herein given.

FFT is used in a wide range of applications, such as image analysis, image reconstruction and image compression, text recognition and more.

The main principle of the FFT follows from the Discrete Fourier Transformation (DFT). Since the DFT requires a great number of calculation, there are other types of transformations which seek to speed up the process. The Fast Fourier Transformations (FFT) is the most established of these. With DFT, the number of calculation is correlated to $N^2$, where N is the length of the input matrix.

FFT algorithm relies on the fact that the standard DFT involves a lot of redundant calculations.

The FFT is computed by dividing the sample sequence into sub-sequences; at each stage N/2 complex multiplications are required to combine the results of the previous stage.

Since there are log(N) stages, the number of complex multiplications requires to evaluate on N-point DFT with the FFT is approximately $N*\log(N)$.

The number of frequencies corresponds to the number of pixels in the spatial domain image, i.e. the images in the spatial and frequency domain are of the same size.

As mentioned above, there are a number of variants of the FFT. The FFT also has its limitations in image processing.

For example, the sides of the image used in input for the FFT need to have lengths in pixels which are a power of two.

Another limitation is that the full FFT needs to be calculated before results for a certain frequency can be given. In other words, the FFT cannot be converted for sparse calculations, since the entire FFT must be calculated before the value for a single frequency can be obtained. The complex structure of the FFT also does not allow for easy coding implementations on re-programmable hardware and multi-core processors. In addition, since the entire FFT first needs to be calculated to obtain single results it also requires higher use of memory on the device.

Methods, such as pruned Fast Fourier Transformations, may be provided, but they require a great deal of complex code for a relatively small gain in speed and memory use, while still being hard to implement on re-programmable hardware.

In the spatial domain, the values are usually the light intensity of the pixels, which range from 0 to 255. The Fourier domain values of the same image have a much greater range than the image in the spatial domain.

The Fourier Transform produces a complex number valued output image, which can be displayed with two images, either with the real and the imaginary part or with magnitude and phase. In the image processing, often only the magnitude of the Fourier Transform is displayed, as it contains most of the information of the geometric structure of the spatial domain image. However, to re-transform the Fourier image into the correct spatial domain after some processing in the frequency domain, one must preserve both magnitude and phase of the Fourier image.

In the method according to the present disclosure, it is made possible for all the calculations to be exclusively using the information in the frequency domain.

Since there is no need to keep all the information to return to the spatial domain, there are several advantages.

First, the lack of an extra step back to the spatial domain from the frequency domain speeds up the overall calculations.

Secondly, since the frequency domain data need not to be converted back to a correct spatial domain image, smaller sparse zone can be used. This is because it is not required to have the frequency domain data that will allow for the image data to be converted back to the spatial domain without a large loss of image quality and information. Sparse zones in the frequency domain by themselves do not necessarily contain enough frequency domain information to recreate the spatial image. But they contain enough information for classification.

Thirdly, extra calculations can be carried out to remove the aliasing that is common in FFT and also other calculations to better prepare the data for classification within the frequency domain.

Fourthly, other limits that are present in methods like FFT and DCT are removed. For example the frequency transformations for FFT and DCT are done along the rows and columns of an image and always within a single frame. In this method the directions of the frequency domain transformation can be any permutation, with much more freedom for the transfer function and with the transformations even crossing between frames of a video sequence.

Figure 18:
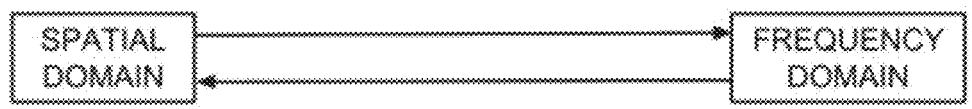
FIG. 18 shows how in the spatial domain for an image, the index indicates the position while the frequencies within the image indicate the sinusoidal changes in pixel intensity and the opposite is true within the frequency domain.
Figure 18:
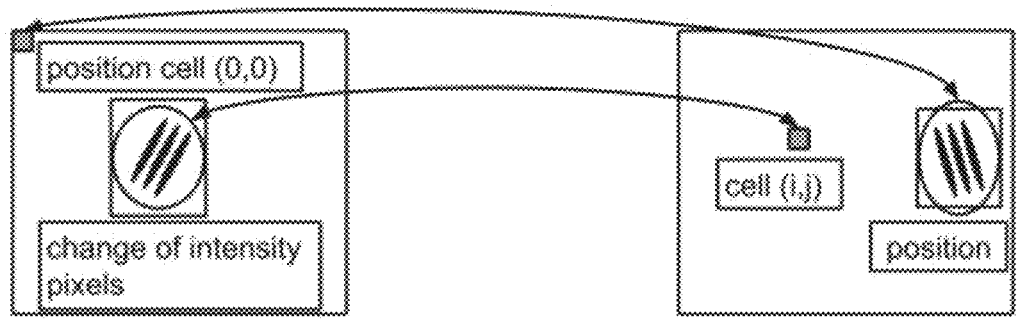

In FIG. 18 it is represented how, in the spatial domain for an image, the index indicates the position while the frequencies within the image indicate the sinusoidal changes in pixel intensity. The opposite is true within the frequency domain, the index shows the frequencies, while the sinusoidal waves contain the position data.

Figure 19:
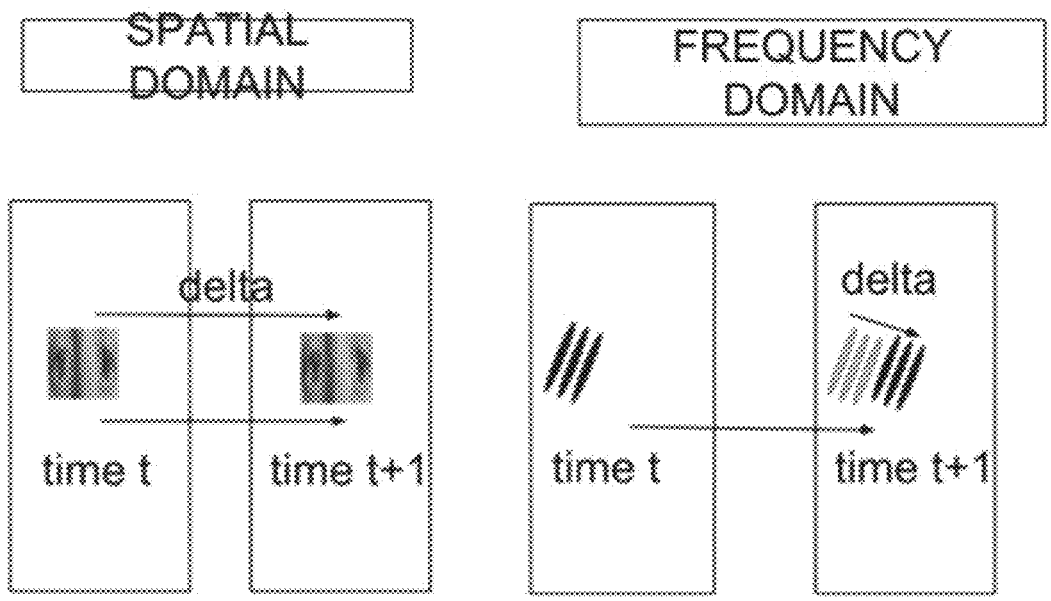
FIG. 19 shows how movement information in the spatial domain for a given object will be captured by a change in the waves that code the position in the frequency domain.

In the same way, movement information in the spatial domain for a given object will be captured by a change in the waves that code the position in the frequency domain. This is schematically shown with images of eye movements in FIG. 19.

Figure 20:
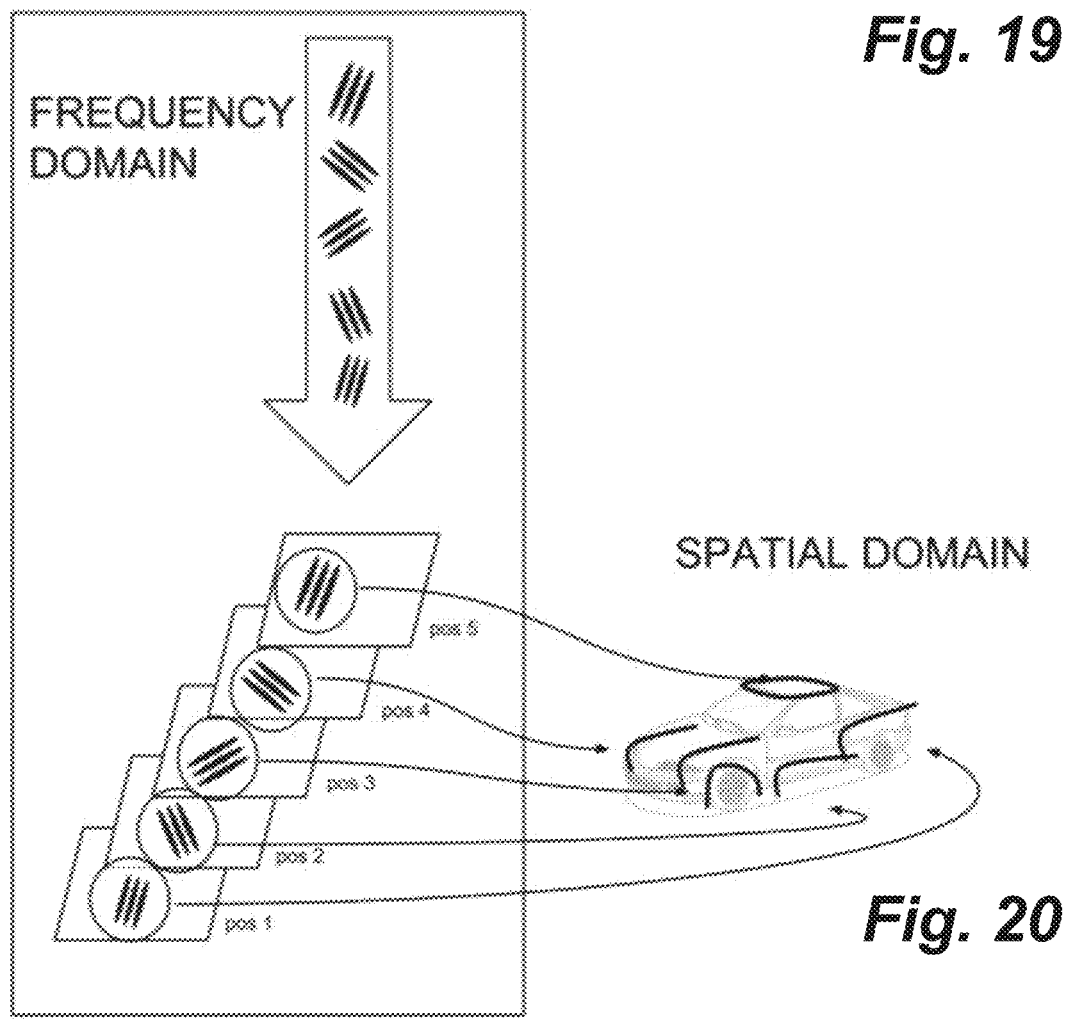
FIG. 20 shows how in the frequency domain a number of waves are required to capture enough positional and shape information to classify the object within the image.

The examples given above are of course simplified for illustrating the concepts. In practice, in the same way that in the spatial domain many frequencies which capture changes in pixel intensity are required to draw an image, in the frequency domain a number of waves are required to capture enough positional and shape information to classify the object within the image. This is represented within FIG. 20.

As mentioned above, each index within the frequency domain potentially affects all pixels in the spatial domain. Therefore, relatively less features are required in the frequency domain to classify an object, compared to classifying an object with features extracted from the spatial domain. In the object detection method herein described a technique is disclosed to find the minimal partial combinations of information in the frequency domain that capture a specific type of shape in the spatial domain. This combination of information can especially also be a sequence of frames in a video stream, with the aim of capturing temporal and dynamic information that is not found when considering each still image of a sequence by itself.

Figure 21:
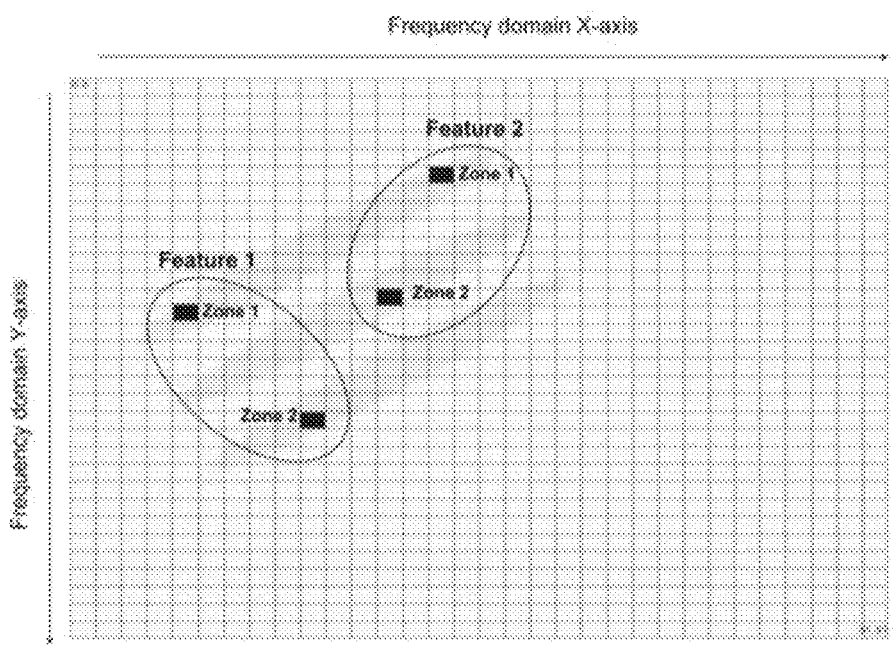
FIG. 21 shows how only a sparse part of the frequency domain information is required to capture the sinusoidal information in the frequency domain.

Here and in the following description, a sparse zone is meant to be a selection of information, covering a fraction of a frequency domain. Each zone should be seen as specific frequency domain information. FIG. 21 shows examples of layouts of sparse features in the frequency domain. Note how each feature is created from a pair of zones. Note that the size of the frequency domain grid is for illustrative purposes only and can be many other sizes as will be illustrated later. FIG. 21 shows an example of a possible frequency domain sinusoidal contrast that captures position and movement in the spatial domain is also shown in overlay. What FIG. 21 shows is that only a part of the frequency domain sinusoidal contrast needs to be captured to detect the type of movement or shape in the spatial domain, which is what the sparse zones do.

The sparse zones may be grouped together, either possibly partially overlapping each other or placed side-to-side, to increase the local resolution.

Calculations on frequency values derived from said sparse zone are indicated as sparse calculations.

Since it is not required to convert the image back to the spatial domain, and not all the frequency domain information is required, it opens to the possibility to use other methods besides DFT or FFT to convert the image into the spatial domain.

According to the present method, one or more pairs of sparse zones are selected, each covering at least a portion of a single frame or, in case of a frame sequence, at least two frames of the sequence.

As mentioned above, each pair of sparse zones generates a feature, and each sparse zone is defined by two sequences of spatial data.

Then, according to the present method, said selected features are transformed into the frequency domain data by combining, for each sparse zone, said the two sequences of spatial data through a 2D variation of an L-transformation, varying the transfer function, shape and direction of the frequency domain data for each zone, thus generating a normalized complex vector for each of said features.

Hence, the transformation may be carried out using further methods such as a two-dimensional transformation derived from the Göertzel algorithm, with considerable design freedom regarding the targeted frequencies, transfer functions used in the transformation and shape and direction of the loop that defines the inputs of the transformation. As will be explained further on in this disclosure, the method used is very different to the Göertzel algorithm and so the description used is that it is a 2D variation of the L-Transformation.

As mentioned before, the advantage of this method is that it can be set up sparsely, in parallel, in a more flexible way for use on re-programmable processors or on GPU, while using a minimal amount of memory. In the following, the theory behind the Göertzel transformation is first described.

After that the implementation for this method is detailed, with the extension for the 2D case in image processing and the various design options that can be used.

When a spectrum analysis in the detection and measurement of a single sinusoidal tones has to be performed, an infinite impulse response (IIR) filter structure is used.

The standard method for spectral energy is the discrete Fourier transform (DFT), typically implemented using a fast Fourier Transform (FFT) or Discrete Cosine Transformation (DCT) algorithm.

However, there are applications that require spectrum analysis only over a subset of the N-bin centre frequencies of an N-point DFT. A popular, as well as efficient, technique for computing sparse FFT results in 1D is the Göertzel algorithm, using an IIR filter implementation to compute a single complex DFT spectral bin value based upon N input time samples.

The most common application of this process it to detect the presence of a single continuous-wave sinusoidal tone. Being a 1D calculation, the Göertzel algorithm is not meant to be used for image processing, where images are 2D.

The Göertzel algorithm is based on the idea to compute the k component of the signal $\{x[n]\}$ of length N $$X[k] = \sum_{n=0}^{N-1} x[n] e^{-j2\pi k \frac{n}{N}} \quad \text{(Equation 1)}$$

Multiplying the right side of this equation (1) by $$e^{j2\pi k \frac{N}{N}} = 1$$

we have:

$$X[k] = e^{j2\pi k \frac{N}{N}} \sum_{n=0}^{N-1} x[n] e^{-j2\pi k \frac{n}{N}} \quad \text{(Equation 2)}$$

which can be written as:

$$X[k] = \sum_{n=0}^{N-1} x[n] e^{-j2\pi k \frac{n-N}{N}} \quad \text{(Equation 3)}$$

the right side of (3) can be seen as a discrete linear convolution of signals $\{x[n]\}$ and $\{h_k[n,]\}$ where:

$$h_k[l] = e^{j2\pi k \frac{l}{N}} u[l].$$

In fact, if $\{y_k[n]\}$ denotes the result of that convolution, then we have:

$$y_k[m] = \sum_{n=-\infty}^{\infty} x[n] h_k[m-n] \quad \text{(Equation 4)}$$

which can be rewritten as:

$$y_k[m] = \sum_{n=0}^{N-1} x[n] e^{-j2\pi k \frac{m-n}{N}} u[m-n] \quad \text{(Equation 5)}$$

A convolution is defined as the integral of the product of two functions after one is reversed and shifted. As such, it is a particular kind of integral transform.

The convolution theorem states that under suitable conditions the Fourier transform of a convolution is the point-wise product of Fourier transforms. In other words, convolution in one domain (e.g., time domain) equals point-wise multiplication in the other domain (e.g., frequency domain)

Comparing (3) with (5) it is obvious that the desired $X[k]$ is the Nth sample of the convolution:

$$X[k] = y_k[N] \quad \text{(Equation 6)}$$

for $k=0, \ldots, N-1$. This means that the required value can be obtained as the output sample in time N of an IIR linear system with the impulse response $\{h_k[n]\}$.

The transfer function $H_k(z)$ of this system will now be derived; it is the L-Transform of its impulse response:

$$H_k(z) = \sum_{n=-\infty}^{\infty} h_k[n] z^{-n} \quad \text{(Equation 7)}$$

$$= \sum_{n=-\infty}^{\infty} e^{j2\pi k \frac{n}{N}} u[n] z^{-n} \quad \text{(Equation 8)}$$

$$= \sum_{n=0}^{\infty} e^{j2\pi k \frac{n}{N}} z^{-n} \quad \text{(Equation 9)}$$

$$= \sum_{0}^{\infty} \left( e^{j2\pi k \frac{1}{N}} z^{-1} \right)^n \quad \text{(Equation 10)}$$

the geometric series is convergent and its sum equals the transfer function:

$$H_k(z) = \frac{1}{1 - e^{j\frac{2\pi k}{N}} z^{-1}} \quad \text{(Equation 11)}$$

This gives the following difference equation:

$$y_k[n] = x[n] + e^{j\frac{2\pi k}{N}} y_k[n-1] \text{ with } y_k[-1] = 0 \quad \text{(Equation 12)}$$

Equation (12) involves multiplication by a complex number and each complex multiplication results in four real multiplications and four real additions.

To avoid complex multiplication, the function can be multiplied by a complex conjugate pole and simplified as fo:

$$H_k(z) = \frac{1 - e^{-j\frac{2\pi k}{N}} z^{-1}}{1 - 2\cos\left(\frac{2\pi k}{N}\right) z^{-1} + z^{-2}} \quad \text{(Equation 13)}$$

The difference equation of this IIR of second order is:

$$y_k[n] = \quad \text{(Equation 14)}$$
$$x[n] - x[n-1] e^{-j\frac{2\pi k}{N}} + 2\cos\left(\frac{2\pi k}{N}\right) y_k[n-1] - y_k[n-2]$$

and such structure can be described using the state variables:

$$s[n] = \quad \text{(Equation 15)}$$
$$x[n] - x[n-1] e^{-j\frac{2\pi k}{N}} + 2\cos\left(\frac{2\pi k}{N}\right) s[n-1] - s[n-2]$$

and we set $s[-1]=s[-2]=0$.

$$y_k[n] = X(k) = s[n] - s[n-1] e^{-j\frac{2\pi k}{N}} \quad \text{(Equation 16)}$$

$$y_k[n] = s[n] - e^{-j\frac{2\pi}{N}k} s[n-1] \quad \text{(Equation 17)}$$

$$= A - Be^{-j\theta} \quad \text{(Equation 18)}$$

$$= [A - B\cos\theta] + jB\sin\theta \quad \text{(Equation 19)}$$

$$A = s[n]$$
$$B = s[n-1]$$
$$\theta = \frac{2\pi k}{N}$$

The Göertzel algorithm in fact performs the computation of a single 1D DFT coefficient. Compared to the DFT, it has several advantages and for this reason it is sometimes used in 1D applications.

The Göertzel algorithm is advantageous in situations when only values of a few spectral components are required, not the whole spectrum. An example is the recognition of the press of a button which has a specific audio pulse. In such a case the algorithm can be significantly faster.

The efficiency of using the FFT algorithm for the computation of DFT components is strongly determined by the signal length N (N has to be a power of 2). In contrast, N can be arbitrary in the case of the Göertzel algorithm, and the computation complexity does not vary.

The computation can be initiated at an arbitrary moment, it is not necessary to wait for the whole data block as in the case of the FFT. Thus, the Göertzel algorithm can be less demanding from the viewpoint of the memory capacity, and it can perform at a very low latency. Therefore, the Göertzel algorithm does not need any reordering of the input or output data in the bit-reverse order.

1D Göertzel Algorithm

The algorithm for the 1D Göertzel has a quite basic structure. We can start from the Equation (17).

Some intermediate processing is done in every sample. As with FFT, we work with blocks of samples.

Several settings are required to initialize the calculation of the 1D Göertzel:

1. The sampling rate
2. The block size, N
3. The target frequency

Once the sampling rate and block size are selected, there is a five-step process to compute the constants needed:

The constants k, w, cosine, sine and coeff are defined:

$$k = (int)\left(0.5 + \frac{N * target - freq}{sample - rate}\right) \quad \text{(Equation 20)}$$

$$w = (2\pi/N) * k$$

$$cosine = \cos \omega$$

$$sine = \sin \omega$$

$$coeff = 2*cosine$$

For the per-sample processing three variables are used: $S_0$, $S_1$, and $S_2$. $S_1$ is simply the value of $S_0$ at the last iteration. $S_2$ is the value of $S_0$ two iteration step ago (or in other words one iteration before $S_1$). $S_1$ and $S_2$ must be initialized to zero at the beginning of each block of samples.

For every column (row) of a matrix [n×m] the following three equations are computed:

$$\{S_0 = coeff*S_1 - S_2 + sample$$

$$S_2 = S_1$$

$$S_1 = S_0$$

$$real = (S_1 - S_2 * cosine)$$

$$imag = (S_2 * sine)$$

$$magnitude^2 = real^2 + imag^2\} \quad \text{(Equation 21)}$$

This is the basic version of the 1D Göertzel algorithm. As mentioned above, it gives the same result as a 1D DFT.

A version of the 1D Göertzel can also be used which requires less computations than the basic version, at the expense of the phase information, meaning not calculating both the real and imaginary parts of the transformation. It will be clear that it is preferable to calculate both the real and imaginary parts and that the faster option is only for cases where processor overhead is very strictly capped.

In the faster version the per-sample processing is the same, but the end of block processing is different. Instead of computing real and imaginary components, and then converting those into the relative magnitude squared, the following is directly calculated, without the steps of the basic version where also the real and imaginary components are calculated:

$$magnitude = S_1^2 + S_2^2 - S_1 * S_2 * coeff \quad \text{(Equation 22)}$$

2D Implementation of Version of L-Transformation

It should be noted again that this common version of the Göertzel algorithm is defined for 1D calculations. In image processing the calculations this does not suffice as the calculations for transforming an image into the frequency domain need to be done in two dimensions: X and Y. Also, while a 1D implementation of Göertzel is equivalent to a 1D DFT, for 2D this will not be true. So the Göertzel algorithm would not seem to be a candidate for object detection and image processing. Another limitation for Göertzel is that there is not much ability to tune and optimize for specific signals.

However, the disclosures described the method with which to convert images to the frequency domain with a 2D implementation, starting from the principles of the 1D Göertzel algorithm, but changing them to the extent that it can be called completely new method in 2D, herein described as a 2D variant of the L-Transformation. Also, since the calculations in this method are fully in the frequency domain, without needing to return to the spatial domain, it is not a requirement that the 2D calculations are equivalent to the 2D DFT.

Figure 22:
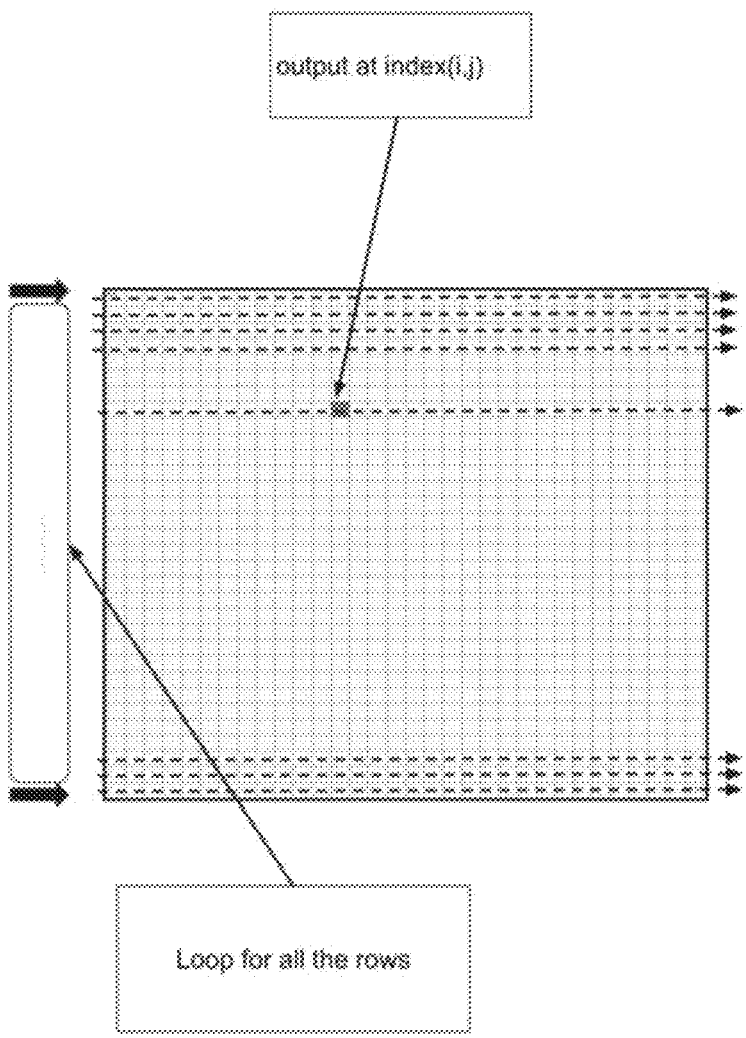
FIG. 22 and FIG. 23 show how a full 2D implementation of Göertzel in effect would be a combination of many 1D Göertzel calculations.
Figure 23:
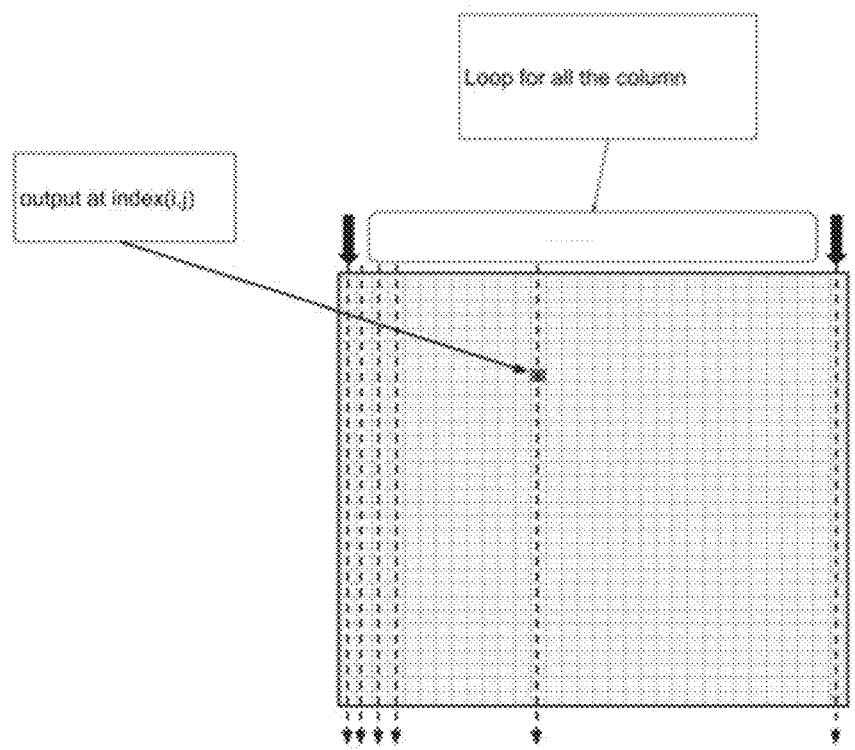

FIG. 22 and FIG. 23 show how a full 2D implementation of Göertzel in effect would be a combination of many 1D Göertzel calculations.

An option would be first to do the various 1D calculations of the rows of FIG. 22 then to use these results for a second step where all the 1D Göertzel calculations are done for the columns, like in FIG. 23. Alternatively, the columns could first be calculated followed by the rows.

Even though the method described here could use such an implementation, it is not the preferred way for several reasons. Firstly, the calculations for the rows would have to wait for the calculations for the columns to finish, or vice-versa.

Figure 24:
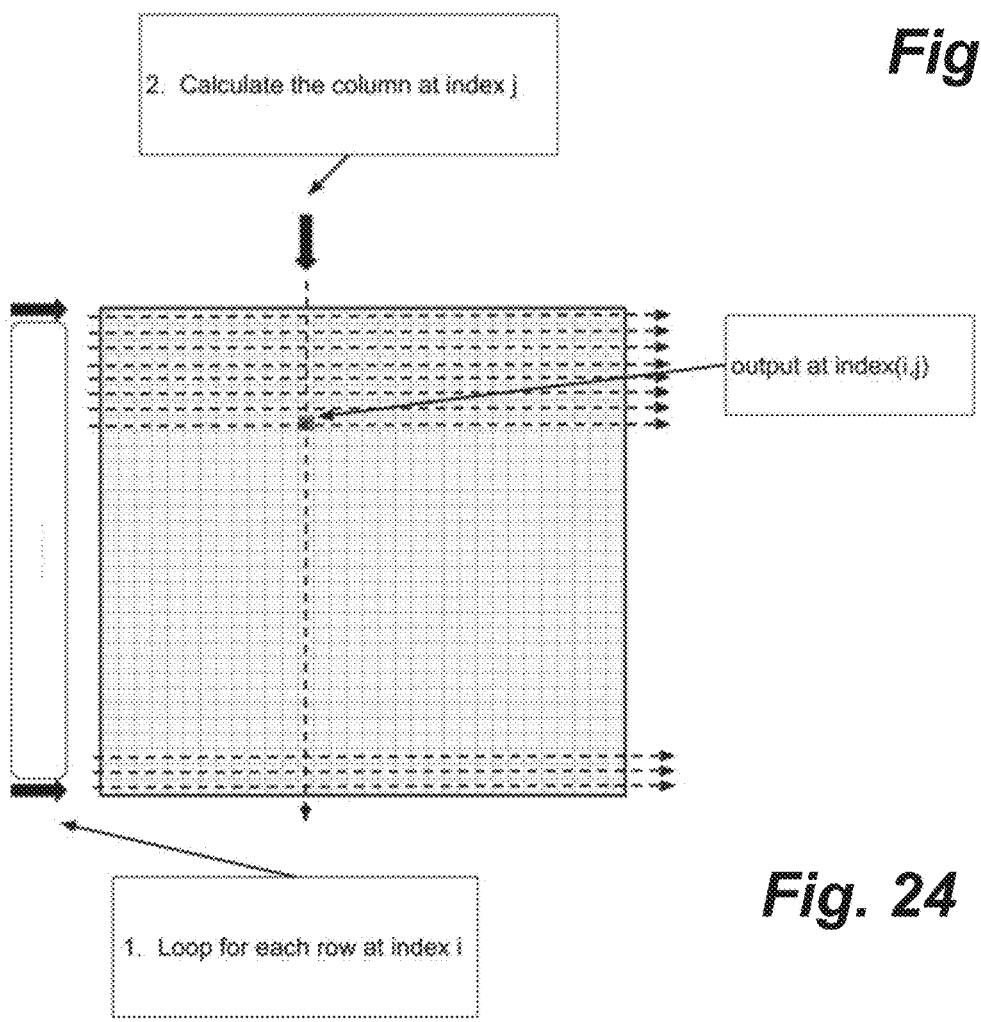
FIG. 24 shows how a full 2D implementation will computationally not be ideal.

Meaning that parallel processing would not be possible. Secondly, the calculations would still not be truly sparse. FIG. 24 illustrates this. In the figure the required calculations are shown for a 2D implementation where the frequency domain value in the index (i, j) is required. In FIG. 24 the option is shown where first the rows are calculated then the columns. The 1D calculations would first have calculated the values for each row at index i. After this the 1D calculation for the column can be calculated be done to get the value at index j. It will be clear that computationally this is not ideal. It will also be clear to experts in the field of frequency domain transformations that a 2D implementation of Göertzel will change the data in such a way that the original image cannot be re-created in a return to the spatial domain. However, as stated before this method describes the classification of data by solely using the frequency domain date. Therefor the driver in the method described here is to have as fast as possible calculations generating the best possible input for the classifiers instead of the driver being the spatial domain data.

Next this disclosure will describe a series of options to have optimized data for classifiers, both in terms of speed and detection. In particular, it will be described how temporal data in a video stream is best captured.

Figure 25:
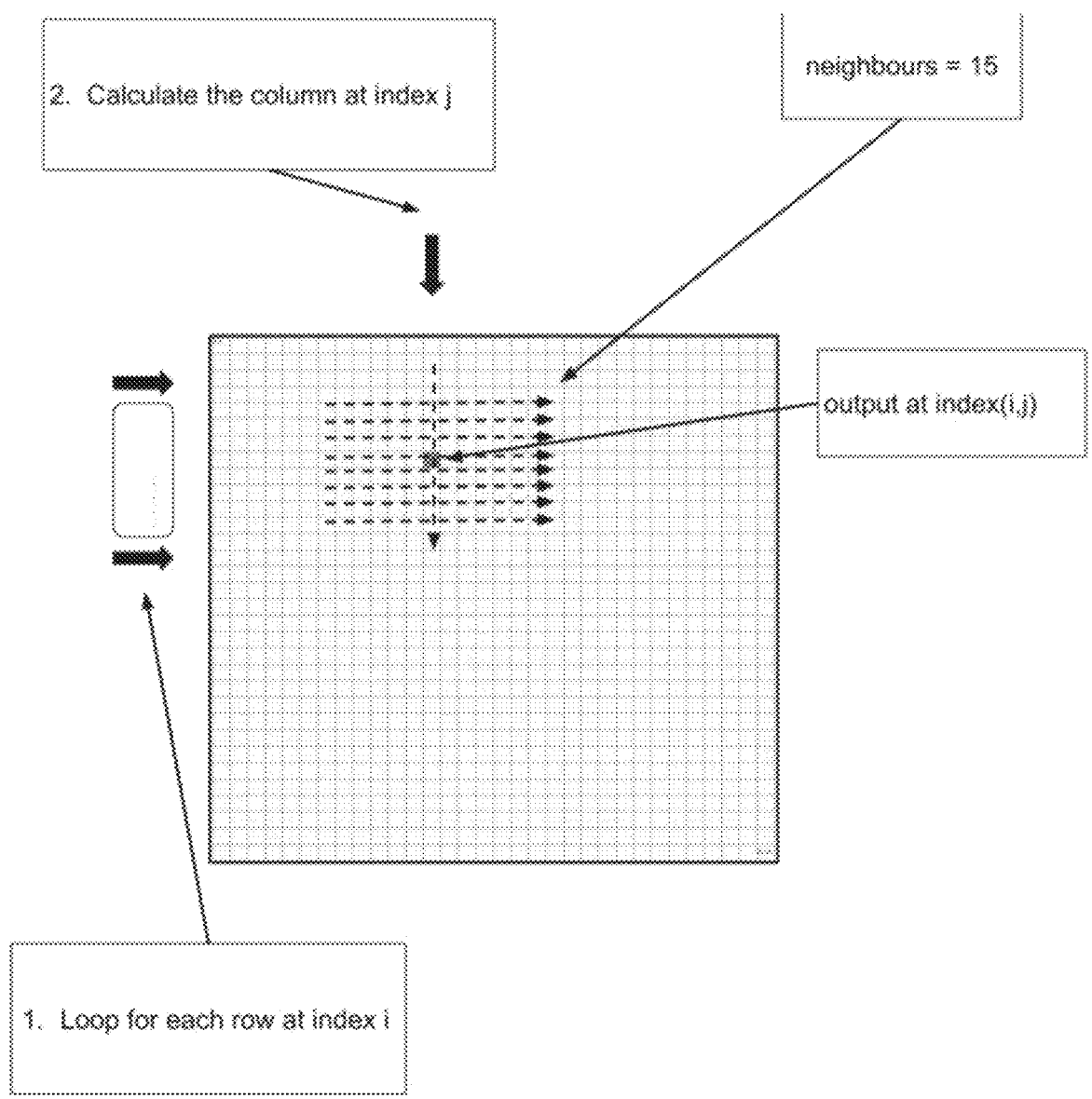
FIG. 25 shows how a full 2D implementation can be made faster, even if still not ideal.

These are, among others:

Using a multitude of features, each of which uses two zones;

Choose number of frames in a sequence of a video stream that are covered by the features and zones;

Choose a different target frequency for each zone;

Have two inputs for each zone, each of which is a frequency domain transformation;

Have a variable core filter for each input which can be optimized for both the real and imaginary parts of the transformation;

Have a variable sequence and shape of the inputs for the loop that defines the frequency domain transformation of each index;

Use the pair of features of each feature to generate a normalized complex vector for each feature; and Finally, combine the all the normalized complex vectors together in a single format;

The calculations can be made sparser than the example in FIG. 24. One way is as shown in FIG. 25, where the input cells for the transformation into the frequency domain are only taken around the position of the index for which the value is needed. However, this would still require the rows to wait for the results of the columns, or vice versa. An advantage would be that the length of the amount of cells could become an input parameter, allowing for more differentiation between features, while it could also be possible to capture details of the object being classified.

Figure 26:
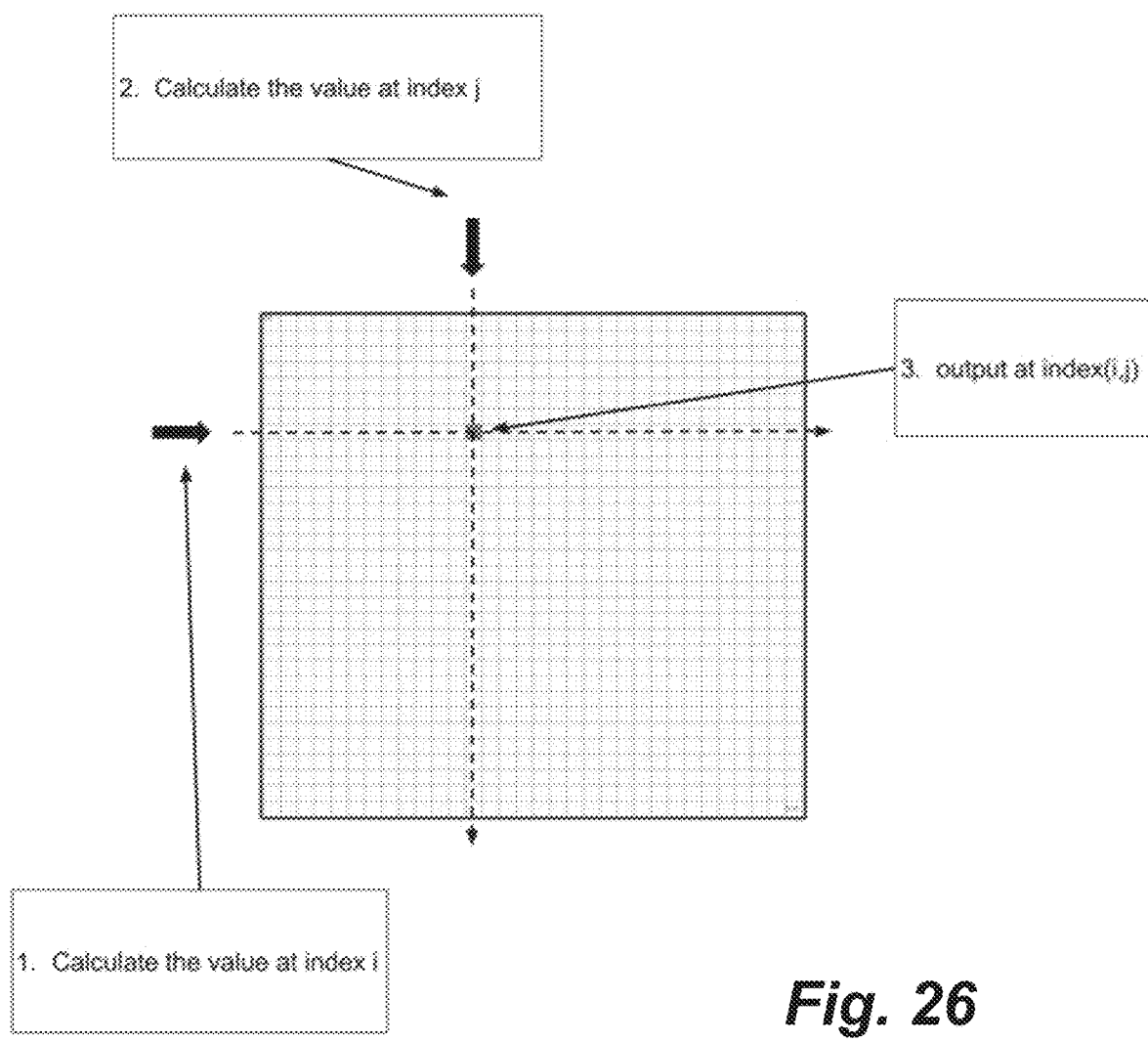
FIG. 26 shows how it is efficient if the result of the index is taken by separately calculating the 1D output for the row and column at the index and then combining this into a single value.
Figure 27:
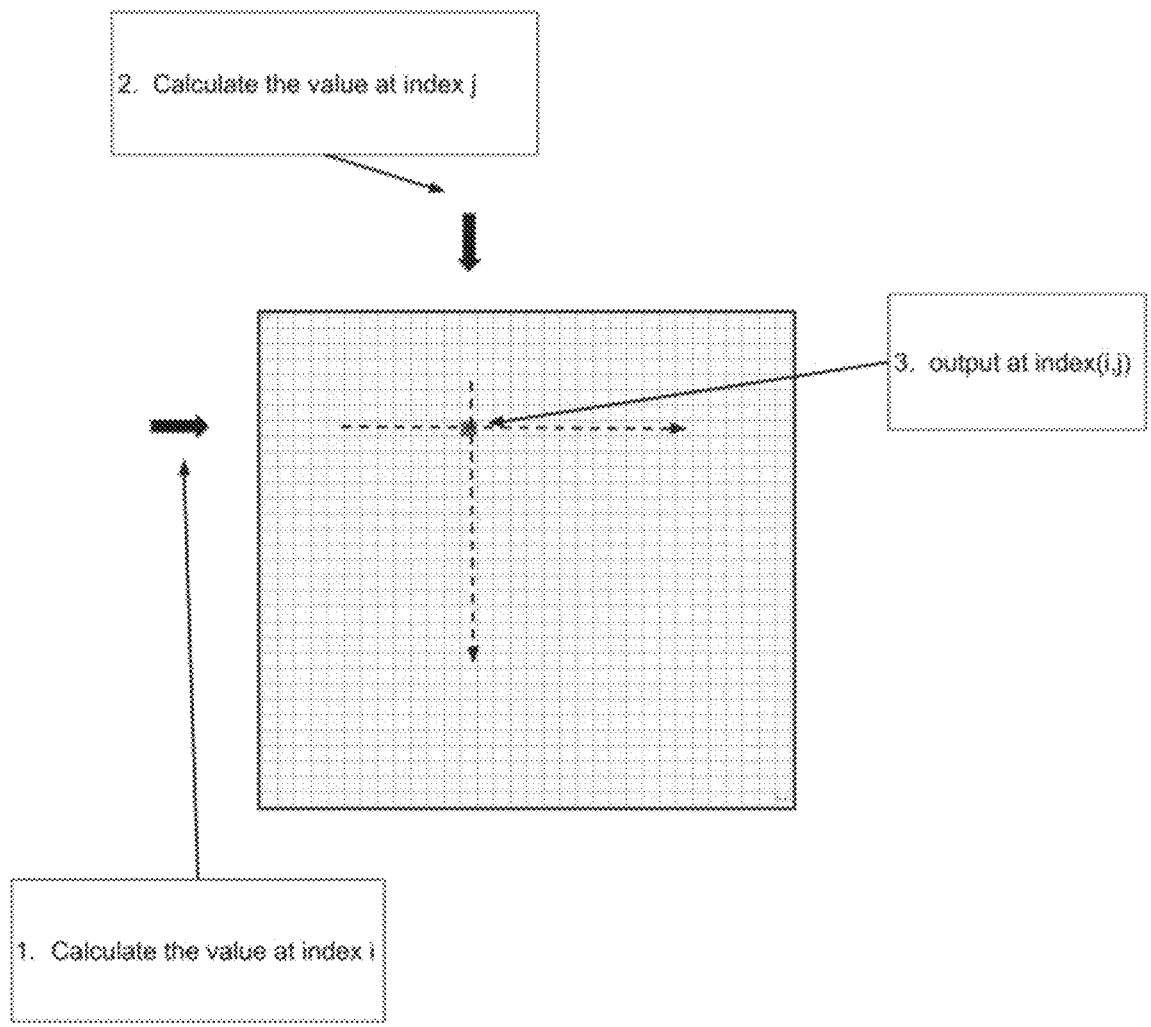
FIG. 27 shows how the computations can be made faster; the input cells for the transformation into the frequency domain are only taken around the position of the index for which the value is needed.

A more effective calculation is shown in FIG. 26. Here the result of the index is taken by separately calculating the 1D output for the row and column at the index and then combining this into a single value. Apart from the gain in speed, the biggest advantage in this manner is that it makes no difference if the 1D for the row or the 1D for the column is calculated first, so the value for the row and column can be calculated in parallel. An even great speed gain can be achieved by limiting the length of the input as shown in FIG. 27, where in this case only a single row and column input need to be calculated.

Figure 28:
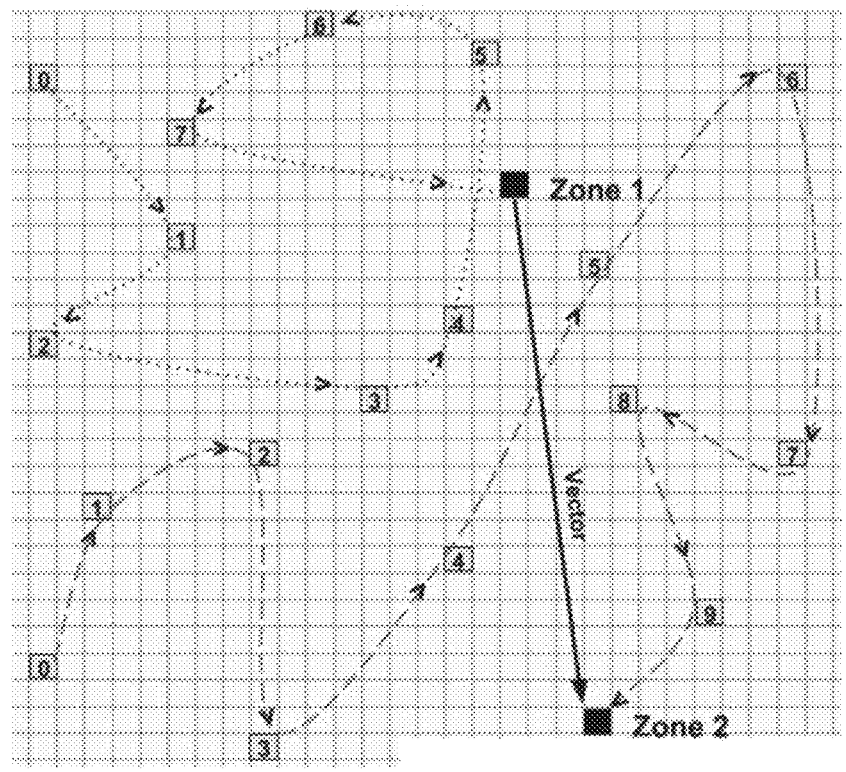
FIG. 28 shows how inputs for the zones are not limited to just rows and columns as inputs, but can be any free shape.

The amount of freedom to train the classifiers with frequency domain input data becomes even greater if you consider that the 2 inputs followed to get a result in a given zone index don't even need to be along the row and column or even adjacent cells, as FIG. 28 shows.

Figure 29:
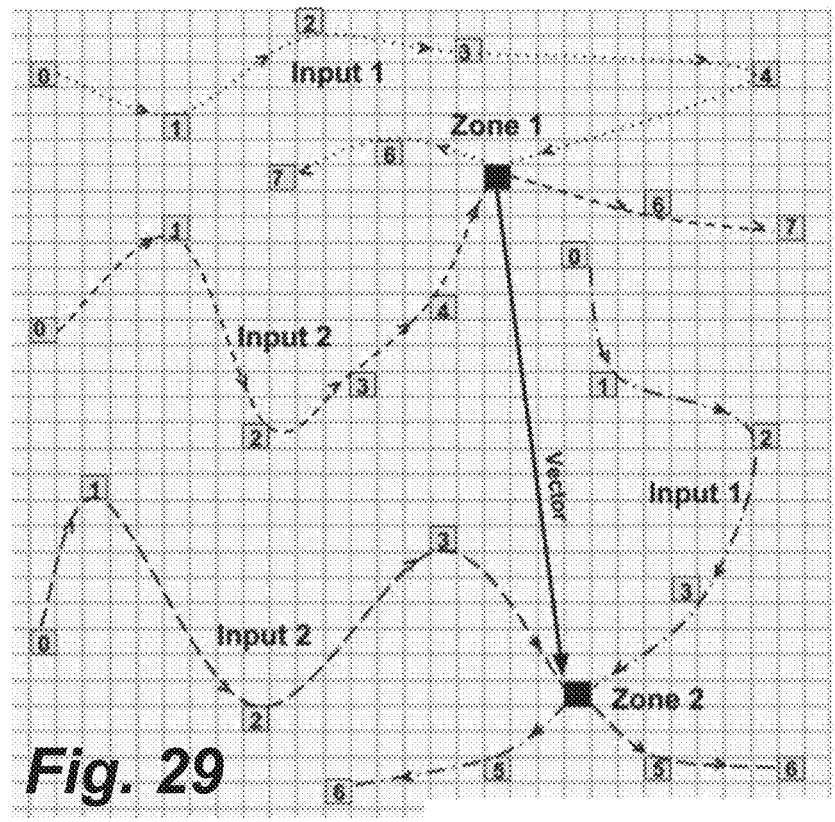
FIG. 29 shows how each zone has two inputs, which can be any free shape.

In the following description often a single input is shown per zone, to keep the figures more schematic. However it should be underlined that there are two inputs for each zone, as shown in FIG. 29.

Figure 30:
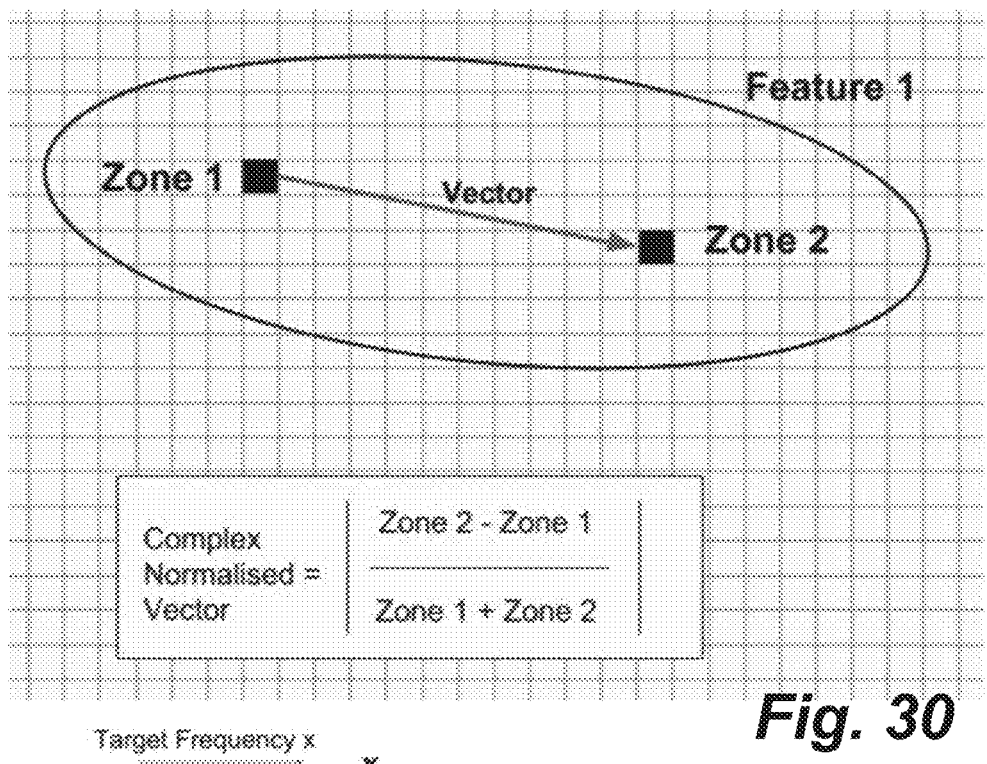
FIG. 30 shows how two zones form a feature, which with a normalization becomes a complex vector giving the information shift between the two zones.

A frequency domain transformation is done for each input, giving a real and an imaginary number. As mentioned, each zone has two inputs and in the following the manner in which to combine them into a single normalized complex value is described. This is also shown in FIG. 30.

First the two real inputs of zone 1 are combined:

$$\text{Real}(\text{Zone1}_{Feature_i}) = \quad \text{(Equation 23)}$$
$$\sqrt{\text{Real}(\text{Input1}_{Zone1})^2 + \text{Imag}(\text{Input1}_{Zone1})^2} +$$
$$\sqrt{\text{Real}(\text{Input2}_{Zone1})^2 + \text{Imag}(\text{Input2}_{Zone1})^2}$$

The two imaginary inputs of zone 1 are combined to give a phase:

$$\text{Imag}(\text{Zone1}_{Feature_i}) = \quad \text{(Equation 24)}$$
$$\angle \frac{\text{Imag}(\text{Input1}_{Zone1})}{\text{Real}(\text{Input1}_{Zone1})} + \angle \frac{\text{Imag}(\text{Input2}_{Zone1})}{\text{Real}(\text{Input2}_{Zone1})}$$

The same process is repeated for the two real and imaginary inputs of zone 2:

$$\text{Real}(\text{Zone2}_{Feature_i}) = \quad \text{(Equation 25)}$$
$$\sqrt{\text{Real}(\text{Input1}_{Zone2})^2 + \text{Imag}(\text{Input1}_{Zone2})^2} +$$
$$\sqrt{\text{Real}(\text{Input2}_{Zone2})^2 + \text{Imag}(\text{Input2}_{Zone2})^2}$$

$$\text{Imag}(\text{Zone2}_{Feature_i}) = \quad \text{(Equation 26)}$$
$$\angle \frac{\text{Imag}(\text{Input1}_{Zone2})}{\text{Real}(\text{Input1}_{Zone2})} + \angle \frac{\text{Imag}(\text{Input2}_{Zone2})}{\text{Real}(\text{Input2}_{Zone2})}$$

Next the results for the real values of zone 1 and zone 2 are combined in a normalization:

$$\text{Real}(\text{Feature}_i) = \left| \frac{\text{Real}(\text{Zone2}) - \text{Real}(\text{Zone1})}{\text{Real}(\text{Zone1}) + \text{Real}(\text{Zone2})} \right| \quad \text{(Equation 27)}$$

This is also done for the imaginary values of zone 1 and zone 2:

$$\text{Imag}(\text{Feature}_i) = \left| \frac{\text{Imag}(\text{Zone2}) - \text{Imag}(\text{Zone1})}{\text{Imag}(\text{Zone1}) + \text{Imag}(\text{Zone2})} \right| \quad \text{(Equation 28)}$$

In this manner each pair of zones that forms 1 feature gives a normalized complex vector, as shown in FIG. 30:

$$\vec{V}_{Feature_i} = \text{Real}(\text{Feature}_i) + j\text{Imag}(\text{Feature}_i) \quad \text{(Equation 29)}$$

A model can be built up with a multitude of such normalized complex vectors:

$$\vec{\mathbb{V}}_{Feature} = \{\vec{V}_{Feature_1}, \vec{V}_{Feature_2}, \ldots, \vec{V}_{Feature_n}\} \quad \text{(Equation 30)}$$

It is this format of a multitude of normalized complex vectors that is the input that the method here describes gives as a new type of input for classifiers. It will be clear to experts in the art that this format allows for all the mathematics of probability theory and quantum physics to be applied for the classification.

The number of frequency domain calculations required to obtain the value in an index will have been strongly reduced in the method described, compared to having pixels in the spatial domain as inputs to a classifier. The values obtained in this way will still be strongly correlated with the shape information in the frequency domain, while also allowing a lot of control de reduce effects like aliasing and periodic signals. The reduction of these effects is important because one key aim is to have a unique result in each index. Here it needs to be noted again that for this method it is not required to have all the data to rebuild the image in the spatial domain. The goal is the capturing of the frequency domain information that sparsely encodes position and movement of the object being detected.

It will clear that the frequency domain space created very strongly reduces the amount of parameters that the classifier needs to process, when compared to directly using the pixel inputs in the spatial domain. This advantage is exponentially amplified when the method described is used to capture temporal information which can only be detected in a sequence of frames in a video stream.

Returning to the 1D calculations along each index, which do not need to be along a row or column, but are free, we can re-write them as follows:

$$k = (Int)\left(0.5 - \frac{N - \text{Target\_frequency}}{\text{Sample\_rate}}\right) \quad \text{(Equation 31)}$$

$$\omega = \left(\frac{2\pi k}{N}\right) \quad \text{(Equation 32)}$$

$$\text{coeff} = 2 \cdot \text{digital\_filter} \quad \text{(Equation 33)}$$

$$\text{digital\_filter} = \sin(A\omega + b\pi) + j\sin\left(A\omega + (2b+1)\frac{\pi}{2}\right) \quad \text{(Equation 34)}$$

$$S_0 = \text{coeff} \cdot S_1 - S_2 + \text{sample} \quad \text{(Equation 35)}$$
$$S_1 = S_0$$
$$S_2 = S_1$$

$$\text{Real} = (S_1 - S_2 \cdot \sin(A\omega + b)) \quad \text{(Equation 36)}$$

$$\text{Imag} = \left(S_2 \cdot \sin\left(A\omega + b\frac{\pi}{2}\right)\right) \quad \text{(Equation 37)}$$

We see how in this method the transfer functions has been rendered tunable, with the parameters a and b, for both the real and imaginary parts of the frequency domain transformations.

It should be noted that these digital transfer function options can be chosen separately for each for each input of a zone, meaning that the first input and second input can have different discrete digital transfer function settings.

As mentioned before, one of the advantages of this method is that the many options described also for a large amount of freedom in tuning the frequency domain data to be cleaned before being used as an input for the classifiers.

Figure 31:
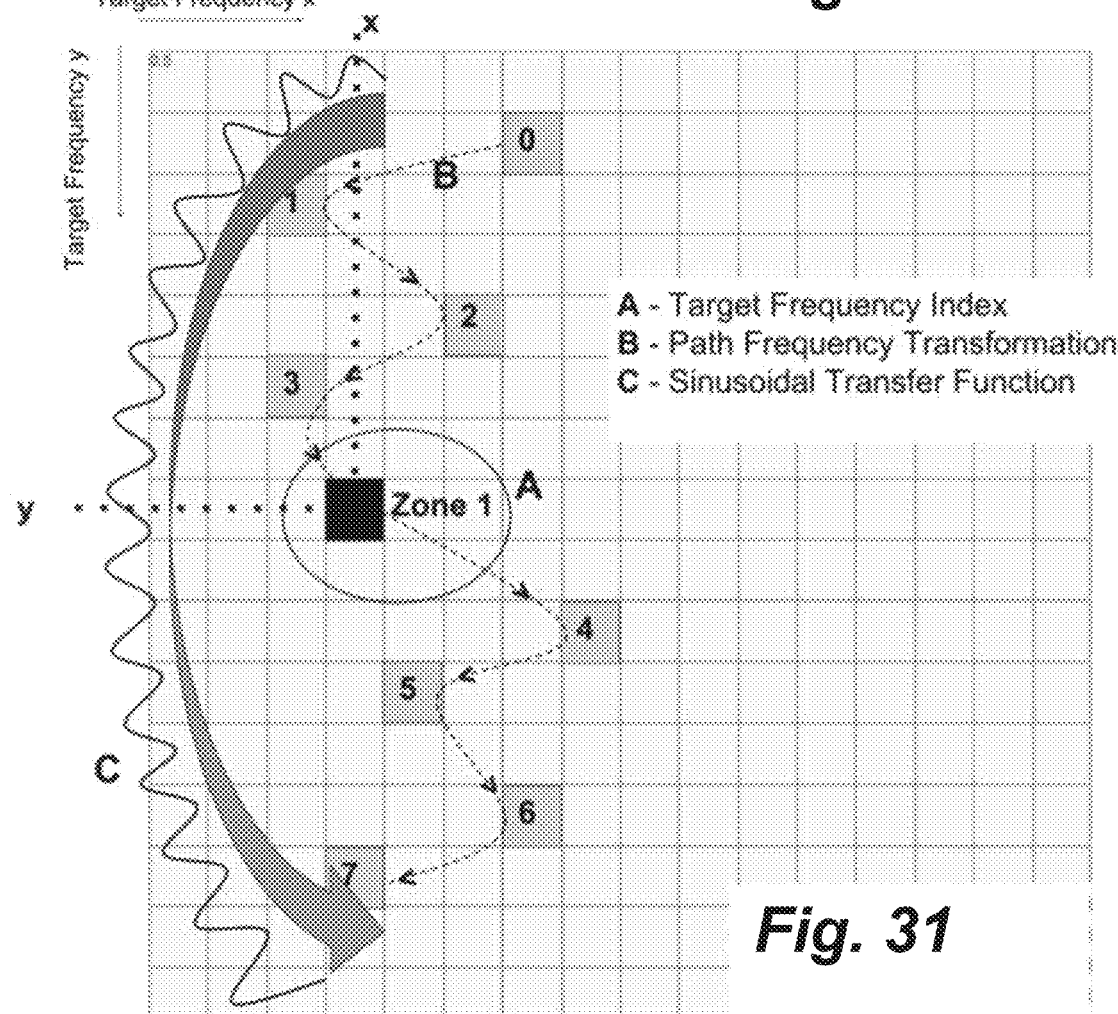
FIG. 31 shows how each index has a target frequency, underlying transfer function for the transformation and a specific feature shape which defines the direction and sequence of the inputs of the frequency domain transformation.

This is shown in FIG. 31. We see how for each input there is freedom to choose the targeted frequency, the direction and sequence of inputs that are used in the core loop and the underlying transfer functions used within the core loop.

Figure 32:
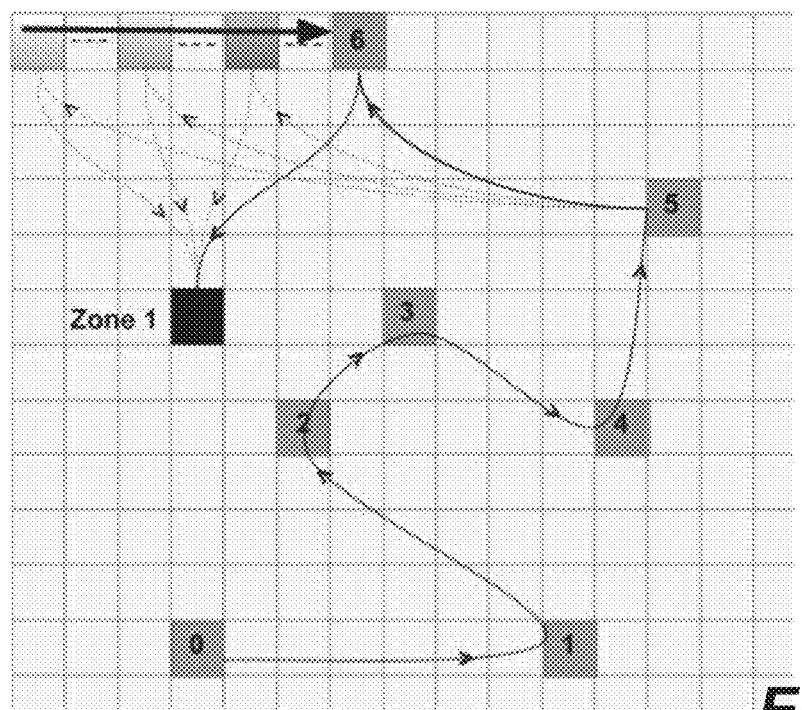
FIG. 32 shows how the shape of the input for the frequency domain transformations can be optimized by sequentially moving each index of the input.

FIG. 32 shows how the direction and sequence of the inputs for the core inner loop can be adjusted in an optimization phase.

It will be clear that at this point the calculations in this method are very different from the theory that uses the L-Transformation (Equation 7) to create the Goertzel algorithm. It is also substantially different from the Z-Transformation, which is connected to the L-Transformation. For the sake of the description, we call here the transformation used in this method a 2D variation of the L-Transformation.

Figure 33:
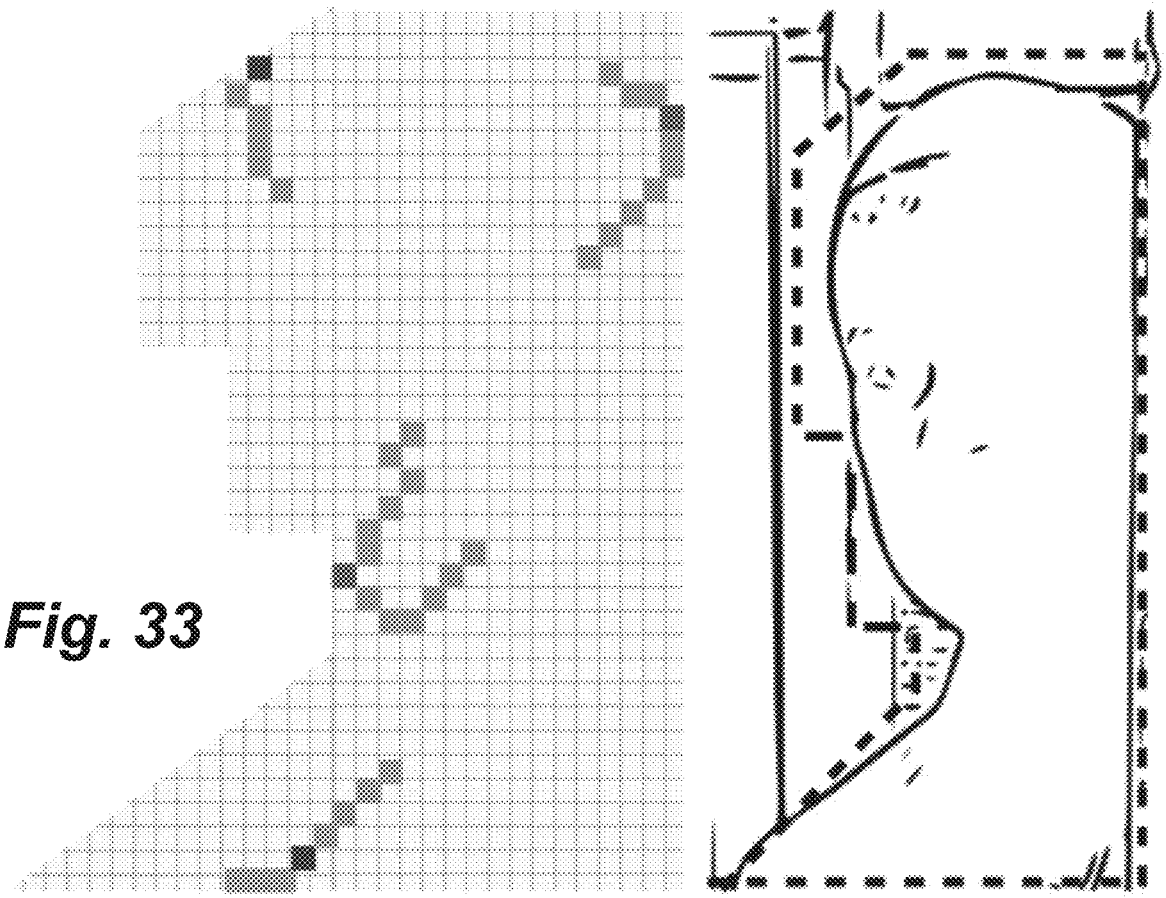
FIG. 33 shows how the input images can be any shape, are not limited to squares and rectangles.

It will be clear to a man skilled in the art that with this method only the frequency domain values in the indexes that contain the features need to be calculated. While in the case of using FFT, all values in the frequency domain would have to be calculated, since FFT cannot be calculated sparsely. It is also important to underline again that this method does not have the limitation of image input size like FFT. In fact there is not even there limitation of having a square or rectangle input image size, as is shown in FIG. 33.

Next, the application of the method to extracting temporal information from a sequence of video frame is described.

Figure 34:
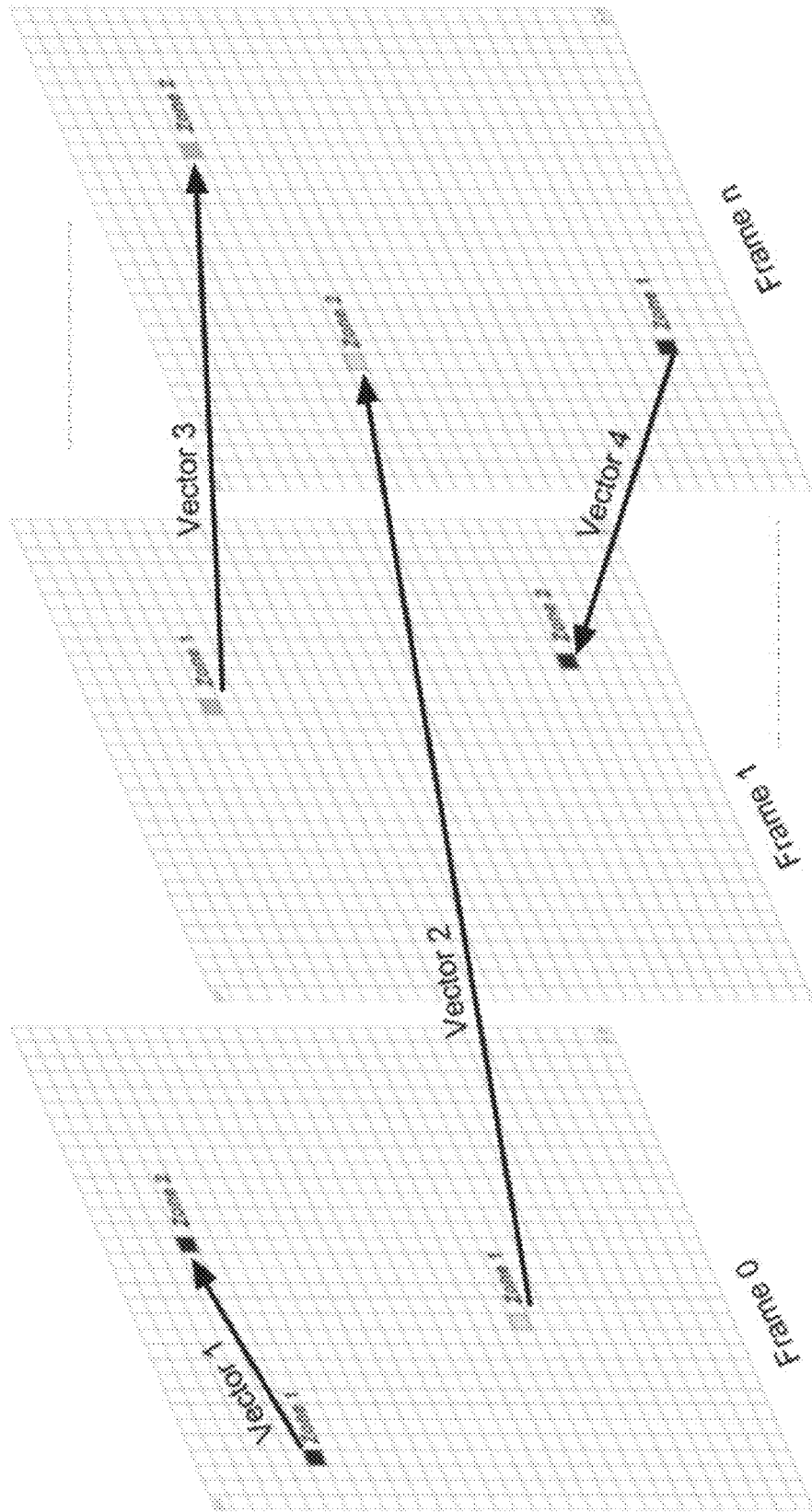
FIG. 34 shows how zones and features can cross-reference data in a sequence of frames in a video stream.
Figure 35:
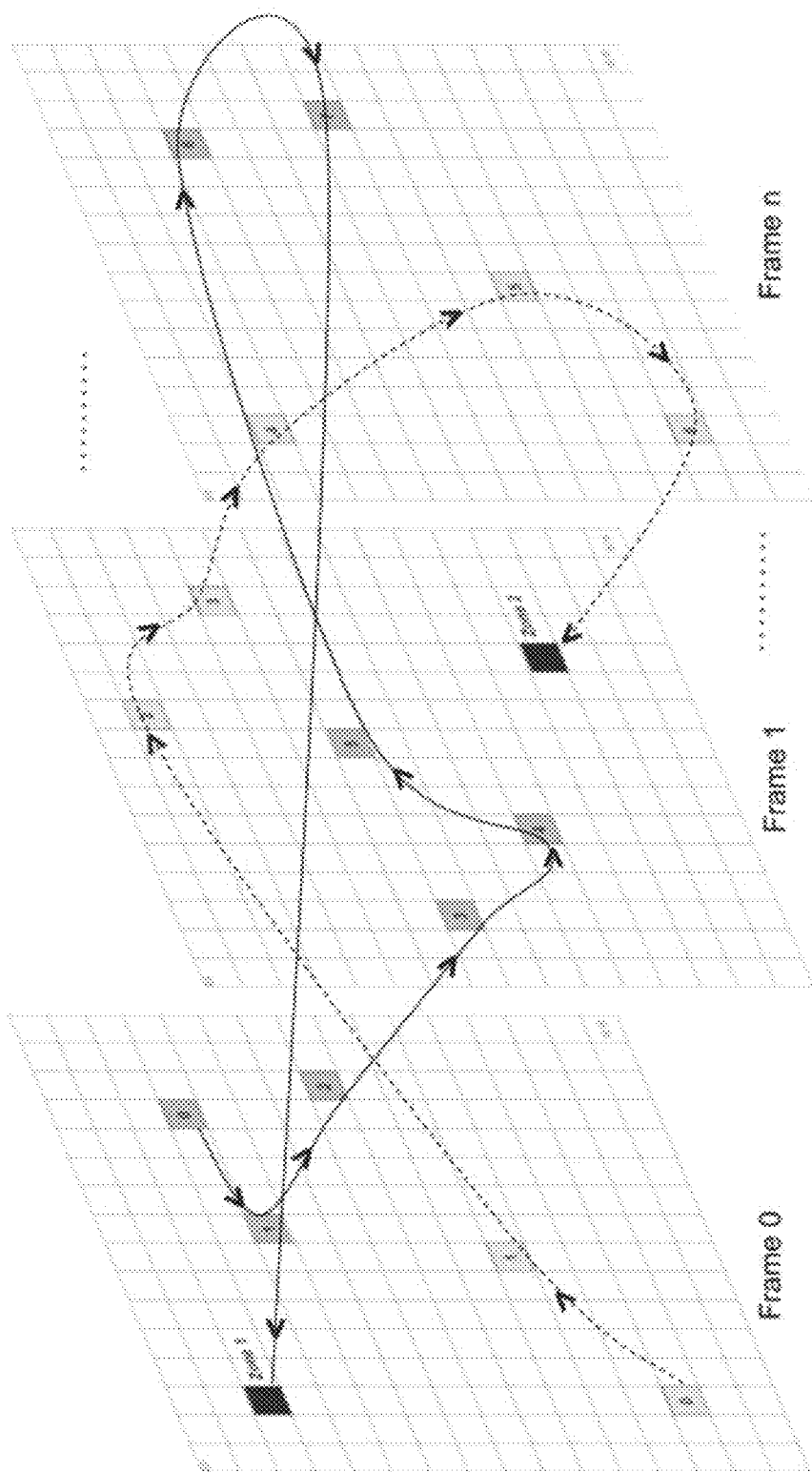
FIG. 35 shows the shapes which define the sequence of the frequency domain transformation of each index are not limited to single frames but can cross-reference multiple frames in a video stream.

FIG. 34 shows how each pair of zones that forms a feature need not necessarily be in the same frame of a video sequence. While FIG. 35 shows how the direction and sequence of each input of the core inner loop can take a path which is not limited to a single frame of a sequence of video frames. It will be clear to experts that if the pixels are directly used as input from the spatial domain, the permutations to solve when cross-referencing pixels between frames of a video sequence will be much slower and much more difficult to train compared to the method described herein.

Figure 36:
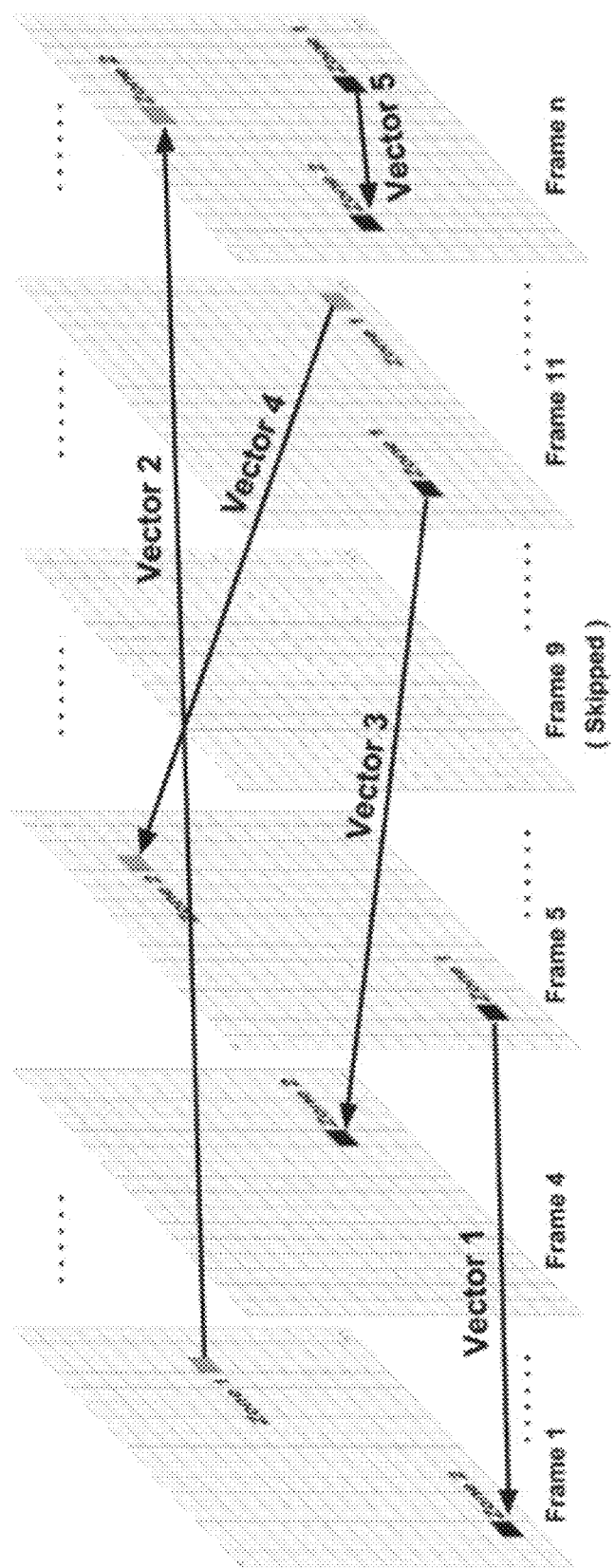
FIG. 36 illustrates the freedom that the method permits in the choice of the sequence of frames used to generate the frequency domain transformations of the model, allowing for true temporal data to be used for the detection of content.
Figure 37:
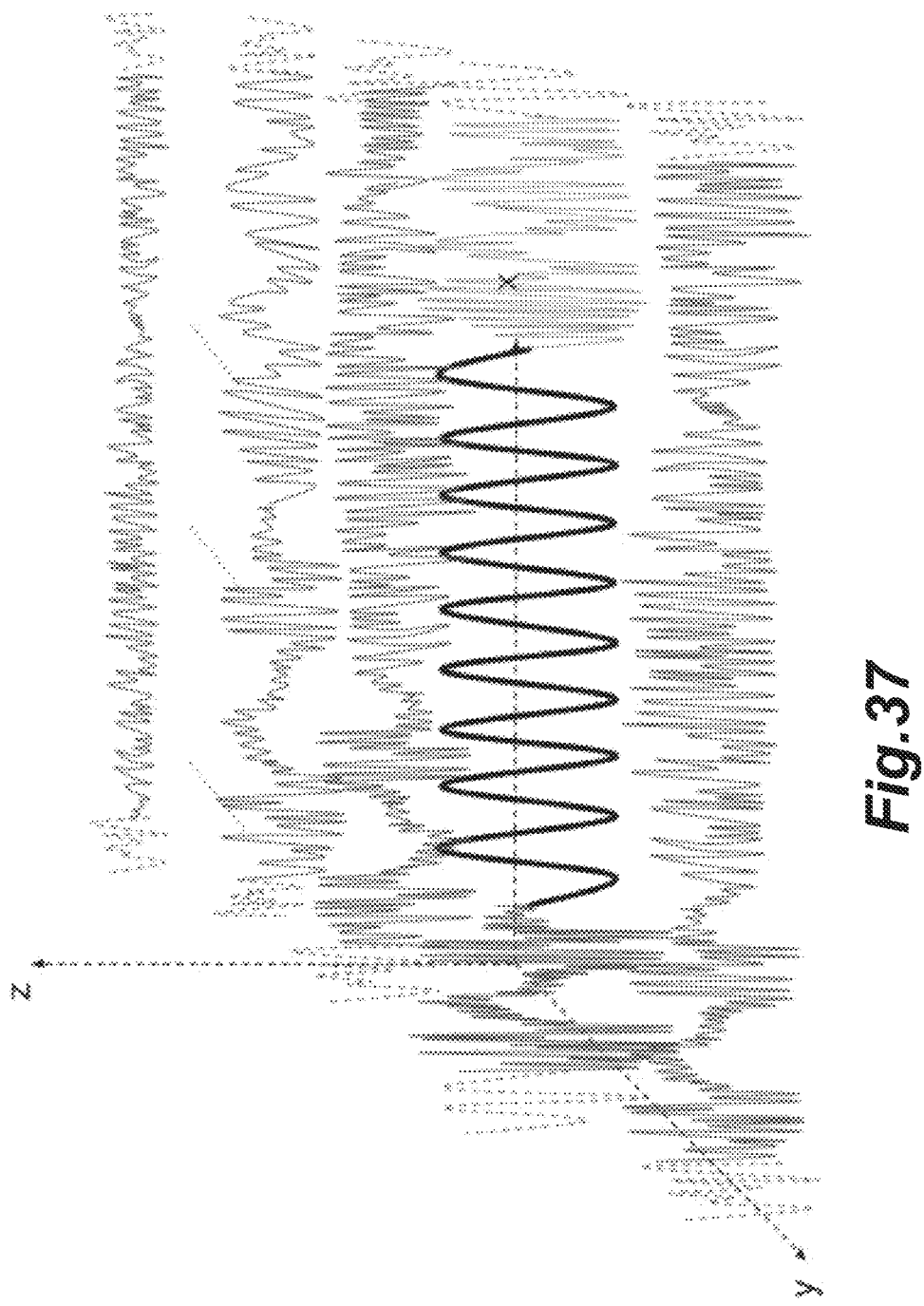
FIG. 37 show how an optimization in the frequency domain has the very big advantage of being clear signals in a very large multi-dimensional area of noise, allowing for now types of logic of not just supervised but also unsupervised learning.

FIG. 36 illustrates the freedom that the method permits in the choice of the sequence of frames used to generate the frequency domain transformations of the model, allowing for true temporal data to be used for the detection of content;

We also see in FIG. 37 how working in the frequency domain has big advantage compared to the spatial domain of pixels. Whereas in the spatial domain each pixel has an input between 0 and 255, without much possibility to reason on the goodness of the pixels, instead in the frequency domain the search space in the frequency domain is for the greatest part made up of a great deal of noise, with the signals clearly standing out. Hence the method described herein also has the potential for more effective optimization logics, basic on signal quality, which potentially can also be done in an unsupervised manner.

Figure 38:
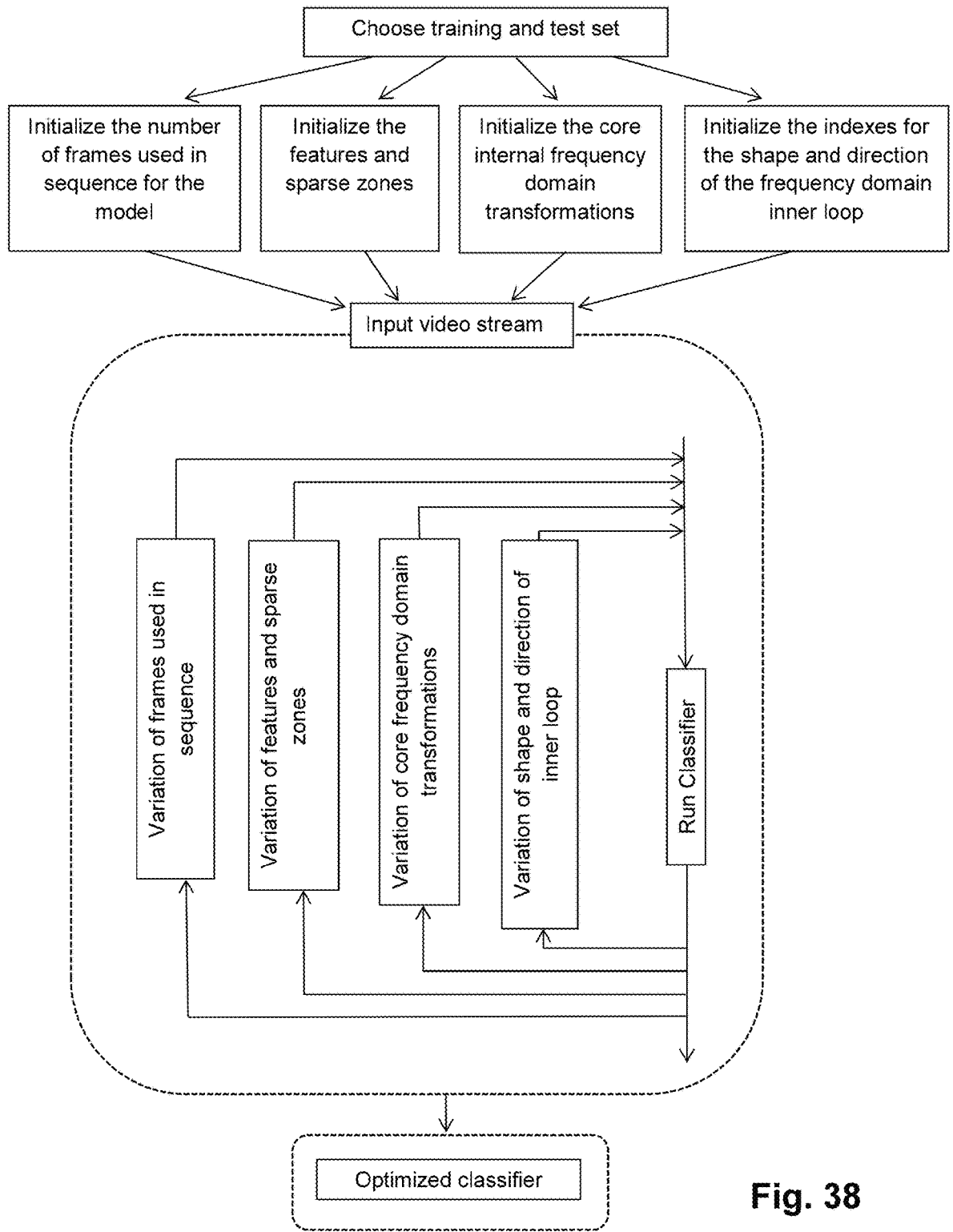
FIG. 38 shows the flow diagram which is an example of a possible optimization logic for the method described.

FIG. 38 shows a possible higher level diagram of a training that can be used for the method described when using the method to create models which detect temporal effects in a sequence of video frames. FIG. 38 shows how the number of frames used in sequence is a variable and then for each index of each feature, as also shown in FIG. 31, the target frequency is optimized, the sequence of the underlying loop is chosen and the underlying transfer functions used within the loop is optimized. This is done for both the real and imaginary parts of each loop. The output of the optimization will be a format with a multitude of normalized complex vectors, which can be used as a particularly effective input for the detection and classification of temporal effects in a sequence of video frames, although the method is not limited to such implementations.

The invention claimed is:

1. A method for video compression through image processing and object detection, to be carried out by an electronic processing unit, based either on images or on a digital video stream of images, the images being defined by a single frame or by sequences of frames of said video stream, with the aim of enhancing and then isolating frequency domain signals representing a content to be identified, and decreasing or ignoring frequency domain noise with respect to the content within the images or the video stream, comprising the steps of:
   obtaining a digital image or a sequence of digital images from either a corresponding single frame or a corresponding sequence of frames of said video stream, all the digital images being defined in a spatial domain;
   selecting one or more pairs of sparse zones, each covering at least a portion of said single frame or at least two frames of said sequence of frames, each pair of sparse zones generating a selected feature, each zone being defined by two sequences of spatial data;
   transforming the selected features into frequency domain data by combining, for each zone, said two sequences of spatial data through a 2D variation of an L-transformation, varying a respective transfer function, shape and direction of the frequency domain data for each zone, thus generating a normalized complex vector for each of said selected features;
   combining all said normalized complex vectors to define a model of the content to be identified; and
   inputting that model from said selected features in a classifier, therefore obtaining the data for object detection or visual saliency to use for video compression.

2. The method for video compression as defined in claim 1, wherein the step of transforming the selected features into frequency domain data uses spatial data from a varying number and/or choice of frames.

3. The method of video compression according to claim 1, wherein a search logic is used on the full input image to generate an input frame where said sparse zones are identified.

4. The method of video compression according to claim 1, wherein said sparse zones are grouped together, either possibly partially overlapping each other or placed side-to-side, to increase a local resolution of said digital image at said sparse zones.

5. The method of video compression according to claim 1, wherein the transforming the selected features into frequency domain data is carried out in parallel with respect to said two sequences of spatial data.

6. The method of video compression according to claim 1, wherein, in the transforming step, first 1D Göertzel calculations are performed by rows and then the results are used for a second step wherein 1D Göertzel calculations are performed by columns, or vice versa.

7. The method of video compression according to claim 1, wherein, for each sparse zone of a pair, different target frequencies are chosen.

8. The method of video compression according to claim 1, wherein input cells of digital images for the step of transforming into the frequency domain data are only taken around a position for which a transforming computing is needed.

9. The method of video compression according to claim 8, wherein the transforming computing of the position is taken by separately calculating the 1D output for the row and column at the position and then combining this into a single value.

10. The method of video compression according to claim 1, wherein the transfer function is chosen separately for each input of a sparse zone, so that the first input and second input have different discrete transfer function settings.

* * * * *